(12) United States Patent
Bajpai et al.

(10) Patent No.: US 12,322,098 B2
(45) Date of Patent: Jun. 3, 2025

(54) SYSTEMS, METHODS, AND APPARATUSES FOR GENERATING PRE-TRAINED MODELS FOR NNU-NET THROUGH THE USE OF IMPROVED TRANSFER LEARNING TECHNIQUES

(71) Applicant: Arizona Board of Regents on behalf of Arizona State University, Scottsdale, AZ (US)

(72) Inventors: Shivam Bajpai, Tempe, AZ (US); Jianming Liang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 477 days.

(21) Appl. No.: 17/939,783

(22) Filed: Sep. 7, 2022

(65) Prior Publication Data
US 2023/0072400 A1    Mar. 9, 2023

Related U.S. Application Data

(60) Provisional application No. 63/241,458, filed on Sep. 7, 2021.

(51) Int. Cl.
*G06V 10/77* (2022.01)
*G06T 7/00* (2017.01)
(Continued)

(52) U.S. Cl.
CPC .......... *G06T 7/0012* (2013.01); *G06V 10/467* (2022.01); *G06V 10/768* (2022.01);
(Continued)

(58) Field of Classification Search
CPC ...................................................... G06T 7/00
See application file for complete search history.

(56) References Cited

U.S. PATENT DOCUMENTS 9,152,926 B2    10/2015   Liang et al.
9,330,336 B2    5/2016    Tajbakhsh et al.
(Continued)

FOREIGN PATENT DOCUMENTS

CN     106548472 A  *  3/2017
WO     2012109670 A1    8/2012
(Continued)

OTHER PUBLICATIONS

Al-Hinnawi, A.R.M., et al., "Collaboration between interactive three-dimensional visualization and computer aided detection of pulmonary embolism on computed tomography pulmonary angiography views," (2018), Radiological Physics and Technology 11, pp. 61-72.
(Continued)

*Primary Examiner* — Di Xiao
(74) *Attorney, Agent, or Firm* — Elliott, Ostrander & Preston, P.C.

(57) ABSTRACT

Described herein are means for generating pre-trained models for nnU-Net through the use of improved transfer learning techniques, in which the pre-trained models are then utilized for the processing of medical imaging. According to a particular embodiment, there is a system specially configured for segmenting medical images, in which such a system includes: a memory to store instructions; a processor to execute the instructions stored in the memory; wherein the system is specially configured to: execute instructions via the processor for executing a pre-trained model from Models Genesis within a nnU-Net framework; execute instructions via the processor for learning generic anatomical patterns within the executing Models Genesis through self-supervised learning; execute instructions via the processor for transforming an original image using distortion and cutout-based methods; execute instructions via the processor for learning the reconstruction of the original image from the
(Continued)

transformed image using an encoder-decoder architecture of the nnU-Net framework to identify the generic anatomical representation from the transformed image by recovering the original image; and wherein architecture determined by the nnU-Net framework is utilized with Models Genesis and is trained to minimize the L2 distance between the prediction and ground truth. Other related embodiments are disclosed.

20 Claims, 24 Drawing Sheets

(51) Int. Cl.
 *G06V 10/46* (2022.01)
 *G06V 10/70* (2022.01)
(52) U.S. Cl.
 CPC .................. *G06V 10/7715* (2022.01); *G06T 2207/20081* (2013.01); *G06T 2207/20084* (2013.01); *G06T 2207/30096* (2013.01)

(56) References Cited

U.S. PATENT DOCUMENTS

| | | |
|---|---|---|
| 9,449,381 B2 | 9/2016 | Liang |
| 9,603,554 B2 | 3/2017 | Liang et al. |
| 9,684,957 B2 | 6/2017 | Wu et al. |
| 9,700,213 B2 | 7/2017 | Tajbakhsh et al. |
| 9,710,916 B2 | 7/2017 | Thiagarajan et al. |
| 9,741,116 B2 | 8/2017 | Liang et al. |
| 9,747,687 B2 | 8/2017 | Tajbakhsh et al. |
| 9,924,927 B2 | 3/2018 | Shin et al. |
| 9,959,615 B2 | 5/2018 | Liang et al. |
| 9,978,142 B2 | 5/2018 | Chi et al. |
| 10,045,728 B2 | 8/2018 | Wu et al. |
| 10,052,027 B2 | 8/2018 | Tajbakhsh et al. |
| 10,055,843 B2 | 8/2018 | Tajbakhsh et al. |
| 10,120,980 B2 | 11/2018 | Liang |
| 10,157,467 B2 | 12/2018 | Dincer et al. |
| 10,328,282 B2 | 6/2019 | An et al. |
| 10,610,203 B2 | 4/2020 | Liang et al. |
| 10,643,360 B2 | 5/2020 | Frakes et al. |
| 10,861,151 B2 | 12/2020 | Liang et al. |
| 11,164,067 B2 | 11/2021 | Liang et al. |
| 11,436,725 B2 | 9/2022 | Hosseinzadeh Taher et al. |
| 2017/0124701 A1 | 5/2017 | Liang et al. |
| 2018/0314943 A1 | 11/2018 | Liang et al. |
| 2019/0332896 A1 | 10/2019 | Liang et al. |
| 2020/0074701 A1 | 3/2020 | Liang et al. |
| 2020/0364477 A1 | 11/2020 | Rahman Siddiquee et al. |
| 2020/0380695 A1 | 12/2020 | Zhou et al. |
| 2021/0019928 A1 | 1/2021 | Borer et al. |
| 2021/0150710 A1 | 5/2021 | Hosseinzadeh Taher et al. |
| 2022/0343096 A1* | 10/2022 | Bhargava .............. G06V 20/64 |

FOREIGN PATENT DOCUMENTS

| | | |
|---|---|---|
| WO | 2012109676 A1 | 8/2012 |
| WO | 2013116865 A1 | 8/2013 |
| WO | 2013116867 A1 | 8/2013 |
| WO | 2015031641 A1 | 3/2015 |
| WO | 2015113014 A1 | 7/2015 |
| WO | 2015142808 A1 | 9/2015 |
| WO | 2015164724 A1 | 10/2015 |
| WO | 2015164768 A1 | 10/2015 |
| WO | 2016161115 A1 | 10/2016 |
| WO | 2017027475 A1 | 2/2017 |
| WO | 2021016087 A1 | 1/2021 |

OTHER PUBLICATIONS

Anonymous, Deeply Supervised, Nested Ensemble of Convolutional Neural Nets for Medical Image Segmentation, ECCV-18 submission ID 223, 17 pages.

Anonymous, "NesenNet: A Nested Ensemble of Convolutional Neural Nets for Medical Image Segmentation," pp. 1-8.

Antonelli, M., et al, "Medical Segmentation Decathlon," Nature Communications, vol. 13, No. 1, 2022, 13 pages.

Armato III, S.G. et al., "The Lung Image Database Consortium (LIDC) and Image Database Resource Initiative (IDRI): A Completed Reference Database of Lung Nodules on CT Scans," Medical Physics 38(2), 2011, pp. 915-931.

Badrinarayanan, V., et al., "SegNet, A Deep Convolutional Encoder-Decoder Architecture for Image Segmentation," IEEE Transactions on Pattern Analysis and Machine Intelligence, vol. 39, No. 12 (2017), pp. 2481-2495.

Bajpai, Shivam, "Pre-Trained Models for nnUNet," Thesis Paper Arizona State University (May 2021), 49 pages.

Bouma, H., et al., "Automatic Detection of Pulmonary Embolism in CTA Images," IEEE Transactions on Medical Imaging, vol. 28, No. 8 (2009), pp. 1223-1230.

Buhmann, S., et al., "Clinical Evaluation of a Computer-Aided Diagnosis (CAD) Prototype for the Detection of Pulmonary Embolism" (2007), Academic Radiology, vol. 14, pp. 651-658.

Calder, K. K., et al., "The Mortality of Untreated Pulmonary Embolism in Emergency Department Patients," Annals of Emergency Medicine, vol. 45, No. 3 (2005), pp. 302-310.

Cardona, A. et al, "An Integrated Micro-and Macroarchitectural Analysis of the *Drosophila* Brain by Computer-Assisted Serial Section Electron Microscopy," PLoS Biology, vol. 8, No. 10, 2010, e1000502, 17 pages.

Carreira, J. et al., "Quo Vadis, Action Recognition? A New Model and the Kinetics Dataset," In 2017 IEEE Conference on Computer Vision and Pattern Recognition (CVPR), (Jul. 2017), pp. 6299-6308.

Chen, L. et al., "Self-supervised learning for medical image analysis using image context restoration," Medical Image Analysis, vol. 58, 2019, 12 pages, https://doi.org/10.1016/j.media.2019.101539.

Chen, L.-C., et al., "Encoder-Decoder with Atrous Separable Convolution for Semantic Image Segmentation," Proceedings of the European Conference on Computer Vision (ECCV), 2018, pp. 801-818.

Chen, S. et al., Med3d: Transfer Learning for 3d Medical Image Analysis. arXiv preprint arXiv:1904.00625, 2019, 12 pages.

Çiçek, Ö et al., "3D U-Net: Learning Dense Volumetric Segmentation from Sparse Annotation," arXiv:1606.06650v1 [cs.CV], 2016, 9 pages.

Cireşan, D., et al "Deep Neural Networks Segment Neuronal Membranes in Electron Microscopy Images", in "Advances in Neural Information Processing Systems," 2012, 9 pages.

Cireşan, D., et al., "Multi-col. Deep Neural Networks for Image Classification," Computer Vision and Pattern Recognition (CVPR), 2012, pp. 3642-3649.

Craig, J., "Introduction to Robotics: Mechanics and Control," Third Edition, 2005, Pearson Education, Inc. 408 pages.

Deng, J. et al., "ImageNet: A Large-Scale Hierarchical Image Database," 2009 IEEE Conference on Computer Vision and Pattern Recognition, 2009, pp. 248-255.

Ding, J., et al., "Accurate Pulmonary Nodule Detection in Computed Tomography Images Using Deep Convolutional Neural Networks" (2017), International Conference on Medical Image Computing and Computer-Assisted Intervention, Springer. pp. 559-567.

Dou, Q. et al, "3D Deeply Supervised Network for Automatic Liver Segmentation from CT Volumes," in International Conference on Medical Image Computing and Computer-Assisted Intervention, 2016, pp. 149-157, Springer, Cham.

Drozdzal, M. et al, "The Importance of Skip Connections in Biomedical Image Segmentation," in Deep Learning and Data Labeling for Medical Applications. 2016, pp. 179-187, Springer, Cham.

Engelke, C., et al., "Computer-assisted detection of pulmonary embolism: performance evaluation in consensus with experienced and inexperienced chest radiologists," European Radiology (2008), pp. 298-307.

Fairfield, J., "Toboggan Contract Enhancement for Contrast Segmentation," Proceedings., 10th International Conference on Pattern Recognition, IEEE, 1990, pp. 712-716.

(56) References Cited

OTHER PUBLICATIONS

Fourure, D. et al, "Residual Conv-Deconv Grid Network for Semantic Segmentation," arXiv:1707.07958v2 [cs.CV], 2017.
Gibson, E. et al., "Niftynet: a deep-learning platform for medical imaging," Computer Methods and Programs in Biomedicine 158, 2018, pp. 113-122.
Gidaris, S. et al., "Unsupervised Representation Learning by Predicting Image Rotations," In ICLR 2018, 17 pages.
Glorot, X., et al., "Understanding the difficulty of training deep feed forward neural networks," International conference on artificial intelligence and statistics (2010), pp. 249-256.
Greenspan, H. et al., "Guest Editorial Deep Learning in Medical Imaging: Overview and Future Promise of an Exciting New Technique", IEEE Transactions on Medical Imaging, vol. 35, No. 5, May 2016, pp. 1153-1159.
He, K. et al, "Mask R-CNN," in Proceedings of the IEEE International Conference on Computer Vision, 2017, pp. 2980-2988.
He, K. et al., "Deep Residual Learning for Image Recognition", Proceedings of the IEEE Conference on Computer Vision and Pattern Recognition (CVPR), Jun. 2016, pp. 770-778.
Huang, G. et al., "Densely Connected Convolutional Networks," Proceedings of the IEEE Conference on Computer Vision and Pattern Recognition, 2017, pp. 2261-2269.
Isensee, F. et al., "nnU-Net: a self-configuring method for deep learning-based biomedical image segmentation," Nature Methods 18.2, 2021, pp. 203-211.
Isensee, F. et al., "nnU-Net: Self-adapting Framework for U-Net-Based Medical Image Segmentation," arXiv preprint arXiv:1809.10486v1 [cs.CV], 2018, 11 pages.
Isensee, F., et al, "Automatic Cardiac Disease Assessment on cine-MRI via Time-Series Segmentation and Domain Specific Features", arXiv:1707.00587v2 [cs.CV] 2018, 10 pages.
Isensee, F., et al, "Brain Tumor Segmentation and Radiomics Survival Prediction: Contribution to the BRATS 2017 Challenge", arXiv:1802.10508v1 [cs.CV] 2018, 11 pages.
Jegou, S., et al., "The One Hundred Layers Tiramisu: Fully Convolutional DenseNets for Semantic Segmentation," Computer Vision and Pattern Recognition Workshops (CVPRW) (2017), pp. 1175-1183.
Krizhevsky, A. et al., "ImageNet Classification with Deep Convolutional Neural Networks", Advances in Neural Information Processing Systems, 2012, pp. 1097-1105.
Lecun, Y., et al., "Backpropagation Applied to Handwritten Zip Code Recognition," Neural Computation 1 (1989), pp. 541-551.
Lee, C.Y. et al, "Deeply-Supervised Nets," in Artificial Intelligence and Statistics, PMLR, 2015, pp. 562-570.
Li, X. et al., "H-DenseUNet: Hybrid Densely Connected UNet for Liver and Tumor Segmentation from CT Volumes," IEEE Transactions on Medical Imaging, vol. 37, No. 12, 2018, pp. 2663-2674.
Liang, J. et al., "Computer Aided Detection of Pulmonary Embolism with Tobogganing and Multiple Instance Classification in CT Pulmonary Angiography", Biennial International Conference Information Processing in Medical Imaging, Springer, 2007, pp. 630-641.
Long, J. et al, "Fully Convolutional Networks for Semantic Segmentation," in Proceedings of the IEEE Conference on Computer Vision and Pattern Recognition, 2015, pp. 3431-3440.
Lu, L. et al., "Deep learning and Convolutional Neural Networks for Medical Image Computing: Precision Medicine, High Performance and Large-Scale Datasets," Advances in Computer Vision and Pattern Recognition, 2017, Springer Publishing, 327 pages.
Maizlin, Z.V., et al., "Computer-aided Detection of Pulmonary Embolism on CT Angiography: Initial Experience," Journal of Thoracic Imaging, vol. 22, No. 4, (2007), pp. 324-329.
Masoudi, M., et al., "A new dataset of computed-tomography angiography images for computer-aided detection of pulmonary embolism," in Scientific Data, vol. 5, No. 1, 2018, pp. 1-9.
Milletari, F. et al, "V-Net: Fully Convolutional Neural Networks for Volumetric Medical Image Segmentation," in Fourth International Conference on 3D Vision (3DV), 2016, pp. 565-571.
NesenNet ("NestNet"), https://openreview.net/forum?id=ryPLSWnsM, Apr. 11, 2018, as previously indicated.
Noroozi, M. et al., "Unsupervised Learning of Visual Representations by Solving Jigsaw Puzzles," European Conference on Computer Vision, 2016, Springer International Publishing, pp. 69-84.
Oktay, O. et al., "Attention U-Net: Learning Where to Look for the Pancreas," arXiv preprint arXiv:1804.03999v3, 2018, 10 pages.
Ozkan, H., et al., "A novel method for pulmonary embolism detection in CTA images," Computer Methods and Programs in Biomedicine 113 (3) (2014), pp. 757-766.
Pan, S. J. et al., "A Survey on Transfer Learning," IEEE Transactions on Knowledge and Data Engineering, vol. 22, No. 10, 2010, pp. 1345-1359.
Park. S.C., et al., "A Multistage Approach to Improve Performance of Computer-Aided Detection of Pulmonary Embolisms Depicted on CT Images: Preliminary Investigation," IEEE Transactions on Biomedical Engineering, vol. 58, No. 6, 2011, pp. 1519-1527.
Pathak, D. et al., "Context Encoders: Feature Learning by Inpainting," 2016 Proceedings of the IEEE Conference on Computer Vision and Pattern Recognition (CVPR), pp. 2536-2544, https://doi.org/10.1109/CVPR.2016.278.
Prasoon, A., et al., "Deep Feature Learning for Knee Cartilage Segmentation Using a Triplanar Convolutional Neural Network," in International Conference on Medical Image Computing and Computer-Assisted Intervention—MICCAI (2013), Springer, pp. 246-253.
Quan, T.M., et al., "FusionNet: A Deep Fully Residual Convolutional Neural Network for Image Segmentation in Connectomics," Frontiers in Computer Science, vol. 3, Article 613981, 2021, 12 pages.
Ronneberger, O. et al, "U-Net: Convolutional Networks for Biomedical Image Segmentation," in International Conference on Medical Image Computing and Computer-assisted Intervention, 2015, Springer, Cham., pp. 234-241.
Ross, T. et al., "Exploiting the potential of unlabeled endoscopic video data with self-supervised learning," International Journal of Computer Assisted Radiology and Surgery 13, 2018, pp. 925-933.
Roth, H., et al., "Detection of Sclerotic Spine Metastases via Random Aggregation of Deep Convolutional Neural Network Classifications," arXiv:1407.5976v1 [cs:CV], 2014, 12 pages.
Roth, H.R. et al., "A New 2.5D Representation for Lymph Node Detection using Random Sets of Deep Convolutional Neural Network Observations," in International Conference on Medical Image Computing and Computer-Assisted Intervention—MICCAI 2014: 17th International Conference, Boston, MA, USA, Sep. 14-18, 2014, Proceedings, Part I 17, 2014, Springer International Publishing, pp. 520-527.
Roth, H.R., et al, "Improving Computer-Aided Detection Using Convolutional Neural Networks and Random View Aggregation," IEEE Transactions on Medical Imaging, vol. 35, No. 5, May 2016, pp. 1170-1181.
Roth, H.R., et al., "Deep convolutional networks for pancreas segmentation in CT imaging," SPIE Medical Imaging, International Society for Optics and Photonics (2015), pp. 94131G-1 to 94131G-8.
Sadigh, G. et al., "Challenges, Controversies, and Hot Topics in Pulmonary Embolism Imaging", American Journal of Roentgenology, Mar. 2011, vol. 196, No. 3, pp. 497-515.
Setio, A.A.A. et al., "Pulmonary Nodule Detection in CT Images: False Positive Reduction Using Multi-View Convolutional Networks," IEEE Transactions on Medical Imaging vol. 35, No. 5, May 2016, pp. 1160-1169.
Setio, A.A.A. et al., "Validation, comparison, and combination of algorithms for automatic detection of pulmonary nodules in computed tomography images: The LUNA16 challenge," Medical Image Analysis, vol. 42, 2017, pp. 1-13.
Simonyan, K. et al., "Very Deep Convolutional Networks for Large-Scale Image Recognition," arXiv preprint arXiv:1409.1556, 2014.
Szegedy, C. et al., "Going Deeper with Convolutions," Proceedings of the IEEE Conference on Computer Vision and Pattern Recognition, 2015, pp. 1-9.

(56) References Cited

OTHER PUBLICATIONS

Tajbakhsh, N. et al., "Convolutional Neural Networks for Medical Image Analysis: Full Training or Fine Tuning?," IEEE Transactions on Medical Imaging, vol. 35, No. 5, May 2016, pp. 1299-1312.
Tajbakhsh, N. et al., "Surrogate Supervision for Medical Image Analysis: Effective Deep Learning from Limited Quantities of Labeled Data," IEEE 16th International Symposium on Biomedical Imaging, Venice, Italy, 2019, pp. 1251-1255.
Tajbakhsh, N., et al., "A Comprehensive Computer-Aided Polyp Detection System for Colonoscopy Videos," Information Processing in Medical Imaging (2015), pp. 327-338.
Tajbakhsh, N., et al., "Computer-Aided Pulmonary Embolism Detection Using a Novel Vessel-Aligned Multi-planar Image Representation and Convolutional Neural Networks," Medical Image Computing and Computer-Assisted Intervention (2015), pp. 62-69.
Tajbakhsh, N., et al., "Automated Polyp Detection in Colonoscopy Videos Using Shape and Context Information," IEEE Transactions on Medical Imaging, vol. 35, No. 2, 2016, pp. 630-644.
Tajbaksh, N., et al., "Automatic Polyp Detection in Colonoscopy Videos Using an Ensemble of Convolutional Neural Networks," 2015 IEEE 12th International Symposium on Biomedical Imaging (ISBI), IEEE (2015), pp. 79-83.
Wang, X., et al., "Improving Performance of Computer-aided Detection of Pulmonary Embolisms by Incorporating a New Pulmonary Vascular-tree Segmentation Algorithm" (2012), SPIE Medical Imaging, International Society for Optics and Photonics. pp. 83152U-1 to 83152U-8.
Zhang, R. et al., "Colorful Image Colorization," arXiv:1603.08511v5 [cs.CV], 2016, 29 pages.
Zhou, C., et al., "Preliminary Investigation of Computer-aided Detection of Pulmonary Embolism in Three-dimensional Computed Tomography Pulmonary Angiography Images," Academic Radiology, vol. 12, No. 6 (2005), pp. 782-792.
Zhou, S.K., "Deep Learning for Medical Image Analysis," Academic Press (2016).
Zhou, Z. et al., "Fine-tuning Convolutional Neural Networks for Biomedical Image Analysis: Actively and Incrementally," In 30th IEEE Conference on Computer Vision and Pattern Recognition, CVPR 2017, pp. 4761-4772, 2017a.
Zhou, Z., et al., "Models Genesis: Generic Autodidactic Models for 3D Medical Image Analysis," Medical Image Computing and Computer Assisted Intervention—MICCAI 2019: 22nd International Conference, Shenzhen, China, Oct. 13-17, 2019, Proceedings, Part IV 22, 2019, Springer International Publishing, pp. 384-393.
Zhou, Z., et al, "UNet++: A Nested U-Net Architecture for Medical Image Segmentation," in Deep Learning in Medical Image Analysis and Multimodal Learning for Clinical Decision Support, 2018, pp. 3-11, Springer, Cham.
Zhou, Z., et al., "Nested Neural Network for Medical Image Segmentation," International Conference on Medical Imaging with Deep Learning (MIDL 2018), Amsterdam, Netherlands, 9 pages.
Zhu, Q. et al, "Deeply-Supervised CNN for Prostate Segmentation," in International Joint Conference on Neural Networks (IJCNN), 2017, pp. 178-184.
Zhu, W., et al., "DeepEM: Deep 3D ConvNets with EM for Weakly Supervised Pulmonary Nodule Detection" (2018) arXiv:1805.05373v3 [cs.CV] 2018, 9 pages.
Zhuang, X et al., "Self-supervised Feature Learning for 3d Medical Images by Playing a Rubik's Cube," Medical Image Computing and Computer Assisted Intervention—MICCAI 2019: 22nd International Conference, Shenzhen, China, Oct. 13-17, 2019, Proceedings, Part IV 22, 2019, Springer International Publishing, pp. 420-428.

\* cited by examiner

| Dataset | Modalities | Total Classes | Number of Samples |
|---|---|---|---|
| Brain tumor | MRI (T1, T1c, T2, FLAIR) | 3 | 484 |
| Heart | MRI | 1 | 20 |
| Liver | CT | 2 | 131 |
| Hippocampus | MRI | 2 | 260 |
| Prostate | MRI(T2, ADC) | 2 | 32 |
| Lung | CT | 1 | 63 |
| Pancreas | CT | 2 | 282 |
| Hepatic Vessel | CT | 2 | 303 |
| Spleen | CT | 1 | 41 |
| Colon | CT | 1 | 126 |

TABLE 1: Properties of datasets provided by Medical Segmentation Decathlon

TABLE 2:

| Proxy Task | Purpose | Liver | Tumor |
|---|---|---|---|
| Scratch | Validation | 96.19 | 63.37 |
| Models Genesis | Validation | 96.19 | 65.52 |

TABLE 3:

| Proxy Task | Purpose | Liver | Tumor |
|---|---|---|---|
| Scratch | Test | 95.75 (Rank: 1) | 75.97 (Rank: 5) |
| Models Genesis | Test | 95.72 (Rank: 2) | 77.50 (Rank: 1) |

TABLE 4:

| Proxy Task | Purpose | Tumor |
|---|---|---|
| Scratch | Validation | 69.5 ± 1.13 |
| Models Genesis | Validation | 71.8 ± 1.4 |

TABLE 5:

| Proxy Task | Purpose | Tumor |
|---|---|---|
| Scratch | Test | 73.97 (Rank: 5) |
| Models Genesis | Test | 74.54 (Rank: 3) |

1000

Qualitative Results – Liver and Liver Tumor Segmentation Task.

TABLE 6:

| Experiment | Branch | Figure | Liver | Tumor |
|---|---|---|---|---|
| U-Net | - | - | 96.18 | 63.37 |
| UNet+++ | 1st branch | 11A, element 1101 | 89.96 | 38.03 |
| UNet+++ | 2nd branch | 11A, element 1102 | 94.68 | 59.66 |
| UNet+++ | 3rd branch | 11B, element 1103 | 95.79 | 65.83 |
| UNet+++ | 4th branch | 11B, element 1104 | 96.03 | 66.02 |
| UNet+++ | 5th branch | 11C, element 1105 | 96.11 | 66.25 |

1300

1400

1402

TABLE 7:

| Normalization | Liver | Tumor |
|---|---|---|
| z-score | 96.18 | 63.37 |
| [−1, 1] | 96.37 | 64.41 |

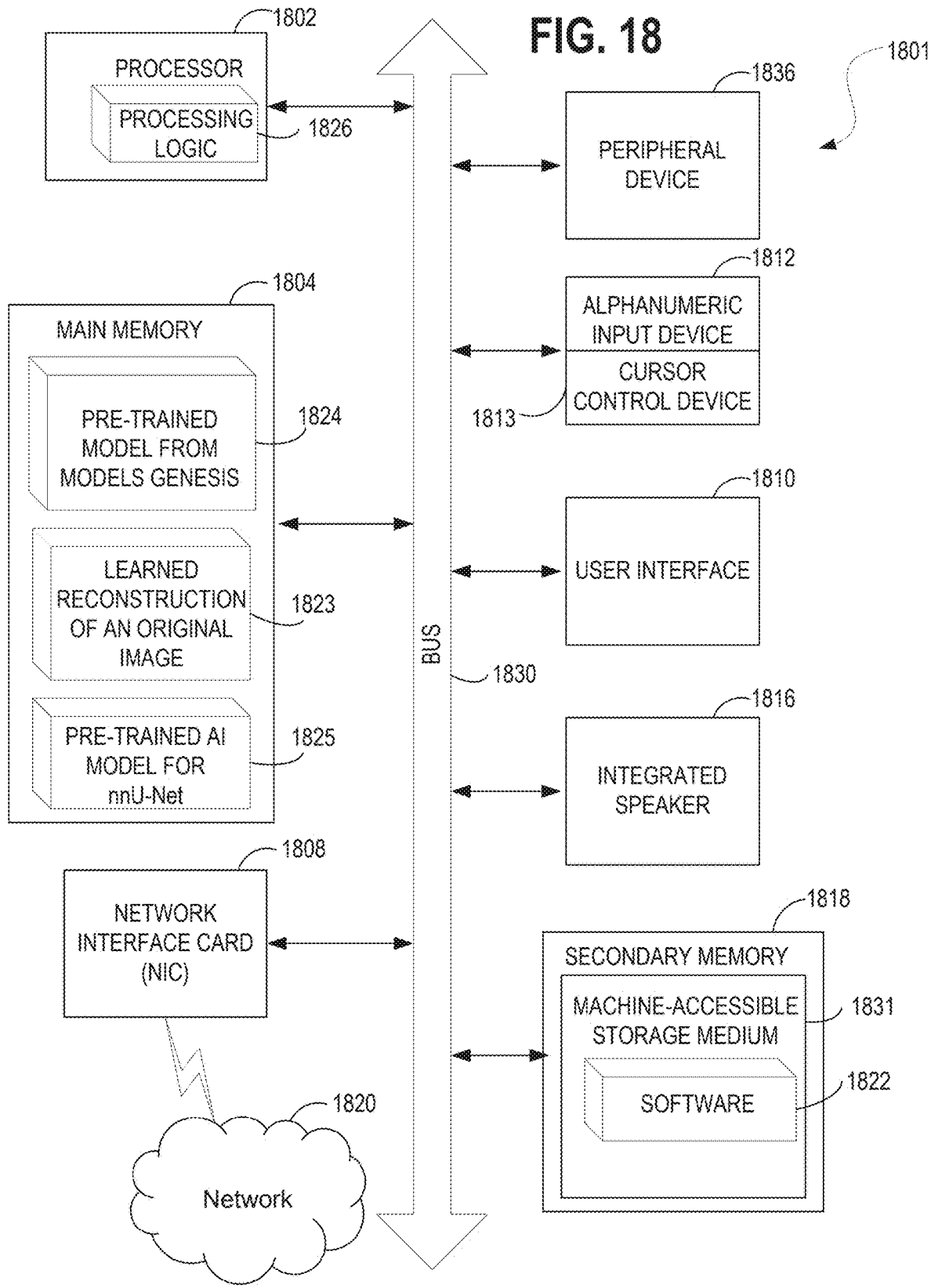

SYSTEMS, METHODS, AND APPARATUSES FOR GENERATING PRE-TRAINED MODELS FOR NNU-NET THROUGH THE USE OF IMPROVED TRANSFER LEARNING TECHNIQUES

CLAIM OF PRIORITY

This U.S. Utility non-provisional patent application is related to, and claims priority to, the U.S. provisional patent application No. 63/241,458, filed Sep. 7, 2021, entitled "SYSTEMS, METHODS, AND APPARATUSES FOR GENERATING PRE-TRAINED MODELS FOR nnUNet THROUGH THE USE OF IMPROVED TRANSFER LEARNING TECHNIQUES," the entire contents of which are incorporated herein by reference as though set forth in full.

GOVERNMENT RIGHTS AND GOVERNMENT AGENCY SUPPORT NOTICE

This invention was made with government support under R01 HL128785 awarded by the National Institutes of Health and 1548562 awarded by the National Science Foundation. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks for the classification and annotation of medical images, and more particularly, to systems, methods, and apparatuses for generating pre-trained models for nnU-Net through the use of improved transfer learning techniques, in which the pre-trained models are then utilized for the processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

The current state of the art for such technology deals with enhancing the function of an algorithm for medical image segmentation 'nnU-Net' (no-new-net), an improvised version of 'U-Net architecture' and making it stable by integrating it with transfer learning. Image segmentation requires dividing an image into meaningful segments and such segments play a crucial role in forming decision in medical imaging by the doctors. However, nnU-Net suffers from hassles of being unstable due to the use of learning from scratch strategy and formulating numerous architecture due to dependency on a specific dataset. By employing transfer learning for nnU-Net, novel concepts are introduced herein which are enabled through the disclosed embodiments to utilize unlabeled data from a source task by exploring supervised learning method called Models Genesis. Further described herein are capabilities for an advanced segmentation architecture like UNet++ which has proven to improve the segmentation task by eliminating the need for numerous specialized architectures.

The present state of the art may therefore benefit from the systems, methods, and apparatuses for generating pre-trained models for nnU-Net through the use of improved transfer learning techniques, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 6 depicts Table 1 providing the properties of datasets provided by Medical Segmentation Decathlon (2019);

FIG. 9 depicts Table 2, Table 3, Table 4, and Table 5, providing various segmentation results;

FIG. 12 depicts Table 6 which depicts both Liver and Liver Tumor Segmentation;

FIG. 18 illustrates a diagrammatic representation of a machine in the exemplary form of a computer system, in accordance with one embodiment.

DETAILED DESCRIPTION

Figure 1:
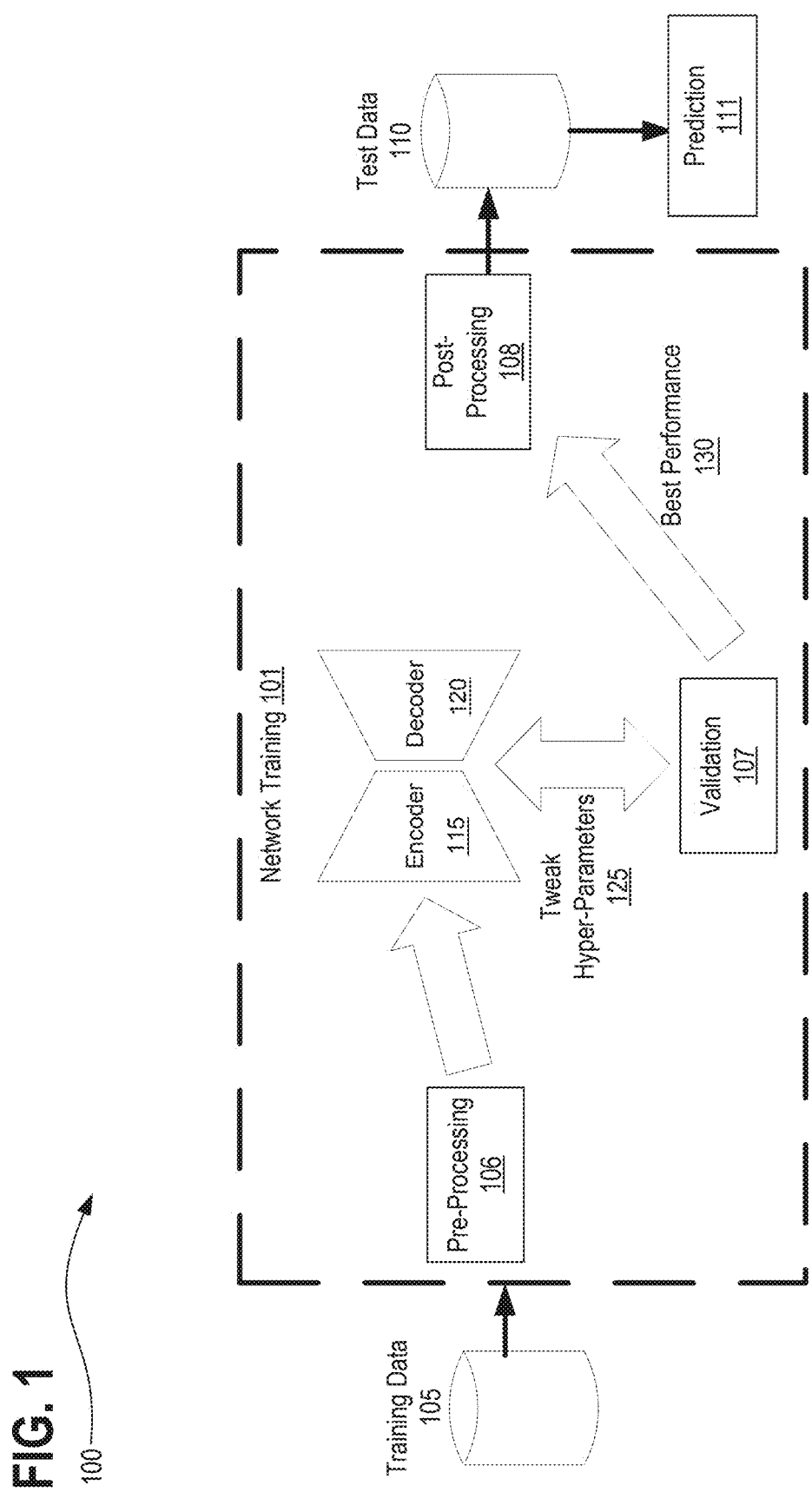
FIG. 1 depicts a simplistic approach where known hyper-parameters and fixed architecture configuration is used, irrelevant to dataset attributes.

Described herein are systems, methods, and apparatuses for generating pre-trained models for nnU-Net through the use of improved transfer learning techniques, in which the pre-trained are then utilized in the context of medical imaging.

As noted above, current technology deals with enhancing the function of an algorithm for medical image segmentation 'nnU-Net' (no-new-net), an improvised version of 'U-Net architecture' and making it stable by integrating it with transfer learning. Image segmentation requires dividing an image into meaningful segments and such segments play a crucial role in forming decision in medical imaging by the doctors. However, nnU-Net suffers from hassles of being unstable due to the use of learning from scratch strategy and formulating numerous architecture due to dependency on a specific dataset. By employing transfer learning for nnU-Net, novel concepts are introduced herein which are enabled through the disclosed embodiments to utilize unlabeled data from a source task by exploring supervised learning method called Models Genesis. Further described herein are capabilities for an advanced segmentation architecture like UNet++ which has proven to improve the segmentation task by eliminating the need of numerous specialized architectures.

Described herein are methodologies which use a pre-trained model system 'Model Genesis' for the nnU-Net framework to enhance the performance of target task indicating importance of transfer learning for tasks with limited data.

Further described are techniques for fine tuning Model Genesis based on nnU-Net architectural framework significantly improves liver and lung segmentation tasks due to scalable, generic, robust image representation learned from consistent and recurrent anatomical structure embedded in medical image.

Still further described are qualitative results indicate that UNet++ in nnU-Net framework can effectively segment and detect liver tumor in CT scan whereas U-Net within nnU-Net framework misses them.

As will be demonstrated herein, UNet++ learns multi-scale image features using encoder-decoder sub-network predictions gaining significant improvement on liver tumor scores than U-Net as well as demonstrated enhancement of functionality for liver and lung segmentation.

1. Introduction:

In past years, the increase in the number of digital images has attracted a lot of researchers to make scientific discoveries. Most of these discoveries leverage Image Processing to extract useful information from the image and utilize it in numerous tasks. One of these tasks is Image Segmentation, a process to divide an image into meaningful segments. In medical image analysis, these meaningful segments refer to the biologically relevant structures such as tumors, organs, etc., making it easier for doctors in forming decisions. Therefore, developing superior methods for precise segmentation has become a hotspot of research in the medical community. Most of the online competitions thrive on finding these methods, by way of either semi-automated or automated means. In recent years, deep learning has become the mainstream approach to develop these methods. Within deep learning, Convolutional Neural Networks (CNNs) have achieved higher performance and have become a backbone for tasks like classification. With the help of downsampling in multiple steps, CNNs try to find the unique features in order to classify an image. To further improve the performance, various extensions of CNNs have been developed, like AlexNet, ResNet, DenseNet, etc.

However, in image segmentation, each pixel should be assigned a class label in order to detect the object of interest. This can be achieved with the help of upsampling operations. A U-Net architecture consisting of an encoder and decoder block may accomplish this task. The encoder downsamples the image to find the unique features while the decoder upsamples these features and localizes the object of interest, resulting in a segmentation map.

In medical image analysis, U-Net, with 22,574 citations, has been the state-of-the-art method for segmentation tasks, even though numerous variations of U-Net have been developed to achieve better performance. For instance, a nnU-Net ("no-new-net") framework, based on U-Net architecture, has been utilized, shown to surpass most of the existing approaches on 23 public datasets in medical image segmentation challenges. It is hypothesized that a basic U-Net can outperform other architectures, given that the corresponding pipeline is designed adequately. To design the corresponding pipeline, the nnU-Net framework adapts to a specific task based on dataset attributes. Further, a set of heuristic rules, combined with hardware constraints, determine the exact network topology, patch size, batch size, and image pre-processing.

Despite the success of the nnU-Net framework, the framework has its own drawbacks which in certain instances, may lead to unstable performance. After a thorough analysis of the framework, the following disadvantages were observed with respect to prior known techniques:

Firstly, the framework utilizes learn from scratch strategy, such as the random initialization of weights while training the tasks with a small dataset. Further, training a specific task may take weeks of processing time to converge. Secondly, the framework formulates numerous specialized architectures due to the dependency on a specific dataset.

The above limitations suppress the performance of the nnU-Net framework on a specific task. To tackle the first limitations, transfer learning techniques were explored. With regard to overcoming the second limitation, utilization of deeper architecture, such as UNet++, was explored to integrate into the nnU-Net framework.

Transfer Learning is used to initialize the starting point of a neural network to be trained on a specific task, with the parameters of a neural network already trained on a similar task. In the real world, humans do not learn everything from scratch. Instead, humans utilize prior knowledge or that which such humans already "know" from their prior experiences, when learning new things. For example, if someone knows how to play the flute, that person may be able to play the harmonica with little guidance. A similar concept has been used in the deep learning paradigm.

The traditional method to train a neural network requires a large amount of labeled data in order to achieve high performance. However, given the fact that data annotation is costly, acquiring such a dataset is tough. This trade-off between the amount of labeled data and performance can be bridged with the help of transfer learning, in which such a transfer learning approach is defined as: Given a source domain $D_S$ and learning task $T_S$, a target domain $D_T$ and learning task $T_T$, transfer learning aims to help improve the learning of the target predictive function $f_T(\bullet)$ in $D_T$ using the knowledge in $D_S$ and $T_S$, where $D_S \neq D_T$ or where $T_S \neq T_T$.

In the medical community, labeled data comes with high costs, while unlabelled data is generated constantly and exists in a relatively higher volume. In order to utilize the unlabelled data for the source task, self-supervised learning was explored.

Such Self-supervised methods assist in the learning of generic visual features from images without utilizing human-annotated labels. This can be achieved with the help of pseudo labels extracted based on the attributes of an image. These pseudo labels help in learning the feature representation from unlabelled data, through training the network to learn the objective functions of the proxy tasks. Moreover, the pseudo labels provide supervision to the network from the data itself. The learned feature representation carries good semantic or structural meanings, further helping in the downstream task. Below are the advantages of transfer learning:

Firstly, even the reduced amount of data for the target task may provide good performance. Secondly, results in a more effective and accurate model for the task at hand. Even though transfer learning has been shown to improve the model for a specific task at hand, the disadvantage is the architecture depth for the target task. The architecture depth is unknown and has to be fixed for weight transfer.

Research Question:

The above limitations of transfer learning and the nnU-Net framework gave rise to the following question: Is it possible to enhance the performance of the nnU-Netframework and make it more stable by advantageously integrating it with transfer learning? The purpose of the novel techniques and methodologies which are described herein were developed to answer this question. Specifically, different tasks utilized in the nnU-Net framework were explored. The nnU-Net framework provides ten architectures for ten different tasks. With the source task and dataset in mind, a specific architecture from the nnU-Net framework was selected (as discussed by the methodology section in greater detail below). Further, the nnU-Net framework determines numerous specialized architectures, and based on this observation, the described methodologies additionally address the following question: Is it possible to utilize one single architecture to learn multi-scale image features?

Developed Hypothesis and Technique:

Pre-trained ImageNet models have provided a significant boost in both natural and medical imaging applications. Further, it has been confirmed that the use of pre-trained models with sufficient fine-tuning is always equivalent to, or better than, training a model from scratch. While pre-trained ImageNet models are supervised and based on 2D natural images, for biomedical imaging applications, the models pre-trained on medical images can yield a more powerful target model than the models pre-trained on natural images, preserving 3D anatomical information. Due to the lack of labeled data in the medical community, a set of pre-trained models, named Models Genesis was therefore proposed, which learn representations from large-scale medical images via self-supervision.

Based on the above exploration, it was hypothesized that the performance of nnU-Net can be boosted significantly and thus developed the above technique which accomplishes this task in two ways:

1. By employing transfer learning to nnU-Net: by transferring generic image representation learned from the massive images to a specific target task. To train the target task, the starting point was utilized from Models Genesis based on nnU-Net architecture.

2. By integrating an advanced segmentation architecture in the nnU-Net framework: The UNet++ was further utilized in support of this work.

Such a hypothesis and the resulting developed methodologies is supported by the set of results showcased in the experimentation section below.

TERMINOLOGY

Terminologies referred to in this document are defined as follows:

1. Domain: A feature space and a marginal probability distribution of the whole dataset define the domain. If two domains are similar enough, then the two domains will have similar feature spaces and similar marginal distributions.

2. Task: A label space i.e. class labels and a learned function from training samples define a task. Different tasks may have different label spaces.

3. Human-annotated Labels: the ground truth labels defined by experts.

4. Pseudo Labels: defined from the data itself without any annotation cost.

5. Proxy Task: learns the predictive function using pseudo labels. The knowledge gained is used for the similar tasks at hand.

6. Target Task: computer vision applications utilizing the knowledge from the proxy task to evaluate the learned feature representations.

7. Downstream Task: computer vision applications utilizing human-annotated labels to evaluate the learned feature representation from pre-trained models. Downstream tasks may have a lesser amount of training data.

Image Segmentation:

Convolutional neural networks (CNNs) have become the core interest in deep learning for various problems, like image classification, speech recognition, etc. Due to the recent advancements in computing resources and data, CNNs are emerging swiftly within the computer vision community. Multiple variations of CNN's are introduced, including: AlexNet, VGG-16, GoogLeNet, and ResNet.

The above variations demonstrate the importance of depth in a neural network. However, these architectures typically serve the purpose of classification on an image level, while the segmentation task requires classification at the pixel level, in order to localize an object within an image. To overcome this limitation, a deep neural network is utilized to classify each pixel in an image with the help of the sliding window approach. Further, fully convolutional networks may be utilized by replacing fully connected layers from deep neural networks with convolutional layers in order to produce a heatmap. Due to the low resolution of the output, in the fully convolutional networks, the segmentation map became fuzzy. Therefore, extended fully convolutional networks may be utilized by introducing upsampling layers in order to increase the resolution of the output and proposed an encoder-decoder architecture named U-Net. To get the segmentation map, the encoder extracts the features, then a decoder projects these features to a higher resolution.

U-Nets are widely used in medical image segmentation tasks because the introduction of skip connections recover full spatial resolutions in the output. However, U-Net architecture was introduced for medical image segmentation tasks in 2D while most of the medical images consist of 3D volumes. To tackle this problem, V-Net with residual blocks, are utilized in both the encoder and decoder, for 3D medical image segmentation tasks. At the same time, a 3D U-Net may be utilized by replacing 2D operations in U-Net, with 3D operations, to segment the volumetric medical images. Still further, specialized architecture and training schemes may be applied to achieve desired performance on a specific dataset. For instance, (1) techniques may utilize and modify the U-Net architecture to process large 3D input blocks for brain tumor segmentation, (2) an architecture may be designed specifically for cardiac disease assessment, (3) H-DenseUNet may be utilized for liver and liver tumor segmentation, (4) Attention U-Net may be utilized for pancreas segmentation, (5) UNet+ and UNet++ architecture may be utilized by redesigning the skip pathways in the U-Net architecture to reduce the semantic gap between the encoder and decoder features.

To address issues within the above techniques, the nnU-Net framework may be utilized which surpasses the existing approaches in the Medical Segmentation Decathlon (2019) challenge. Based on dataset properties, the framework decides the training scheme, such as input patch size, batch size, number of pooling layers, etc. On another note, as discussed in the introduction section, the nnU-Net framework has its own hassles. Therefore, the framework which is described herein was utilized to overcome the limitations described above.

Transfer Learning:

Transfer learning was explored to find the answer to the question discussed in the introduction section. While pre-trained ImageNet models may be utilized, giving a significant boost in the performance of both natural and medical imaging applications, it has since been confirmed that the use of pre-trained models with sufficient fine-tuning will always be equivalent to or better than training a model from scratch.

However, the ImageNet dataset is large scale and contains 1.3 million labeled natural images annotated by humans. Additionally, ImageNet models have been solved in 2D while the medical modalities like CT and MRI belong to 3D imaging tasks. Due to this reason 3D imaging tasks have to be solved in 2D to utilize pre-trained ImageNet models hence losing 3D anatomical information. Therefore, according to certain embodiments, I3D models, expanded in 3D, are pre-trained on Kinetics dataset based on the temporal video. Due to the domain gap in temporal video and 3D medical images, a model zoo in NiftyNet may be utilized for specific applications.

Still further, Med3D pre-trained models may be utilized by jointly training eight annotated medical datasets. The above techniques required a large labeled dataset for pre-trained models. Acquiring such a large dataset in medical images is expensive and time-consuming. To avoid this limitation, various self-supervised methods have been introduced, such as a colorization proxy task where a grayscale image is mapped to color value output using CNN architecture. In addition, context encoders may be used where encoder-decoder architecture reconstructs the missing region in an input image. Further, a method to learn visual representation by solving jigsaw puzzles in an unsupervised fashion may also be applied. Similarly, advanced unsupervised representation learning may be utilized by predicting image rotations.

However, the above publications were based on the context of natural images, though natural images are statistically different from medical images. Further for medical applications, colorization as a proxy task for colonoscopy images may be used.

Image restoration may likewise be designed as a proxy task, where small windows within the image were shuffled for the model to learn the original image. The proxy task may further be designed to recover a refactored rubik's cube. However, such methods were developed individually for specific target tasks with limited generalizability over multiple tasks.

To overcome such a limitation, a self-supervised learning method by utilizing the properties of medical images is applied, namely, a collection of pretrained models called Generic Autodidactic Models, nicknamed Models Genesis. With such an approach, models pre-trained on medical images can yield a more powerful target model than the models pre-trained on natural images. Notably, Models Genesis is the first pre-trained model for open science in medical images.

Methodology:

To demonstrate the boost in the performance, the pre-trained models from Models Genesis were utilized in the nnU-Net framework. In the description that follows, a briefing of the nnU-Net framework and Models Genesis is first provided which is then followed by experimental results.

The nnU-Net Framework—Adaptive Framework for Medical Image Segmentation: The nnU-Net framework is an open-source algorithm that can be used out-of-the-box for multiple segmentation tasks. The framework has been designed based on the dataset properties for different segmentation tasks. One simplistic approach (refer to FIG. 1 below) requires the knowledge of architecture and training parameters beforehand. In contrast, the nnU-Net framework utilizes generic (standard) U-Net architecture and determines training parameters based on the available knowledge of a specific dataset in order to design the algorithm pipeline.

The framework is developed based on datasets provided by the Medical Segmentation Decathlon (2019) challenge. To determine the optimized pipeline, the framework has been divided into multiple components (refer to FIG. 2 below).

FIG. 1 depicts a simplistic approach where known hyper-parameters and fixed architecture configuration is used, irrelevant to dataset attributes.

As shown here, there is training data 105 which is inputted into the network training 101 process. Pre-processing 106 feeds into the encoder 115 and decoder 120 where hyper-parameters 125 may then be tweaked before being pushed into validation 107. The best performance 130 is then outputted for post processing at block 108 resulting in the test data 110 being produced as an outcome of the processing from the network training 101 operations and ultimately a prediction 111 being rendered.

Figure 2:
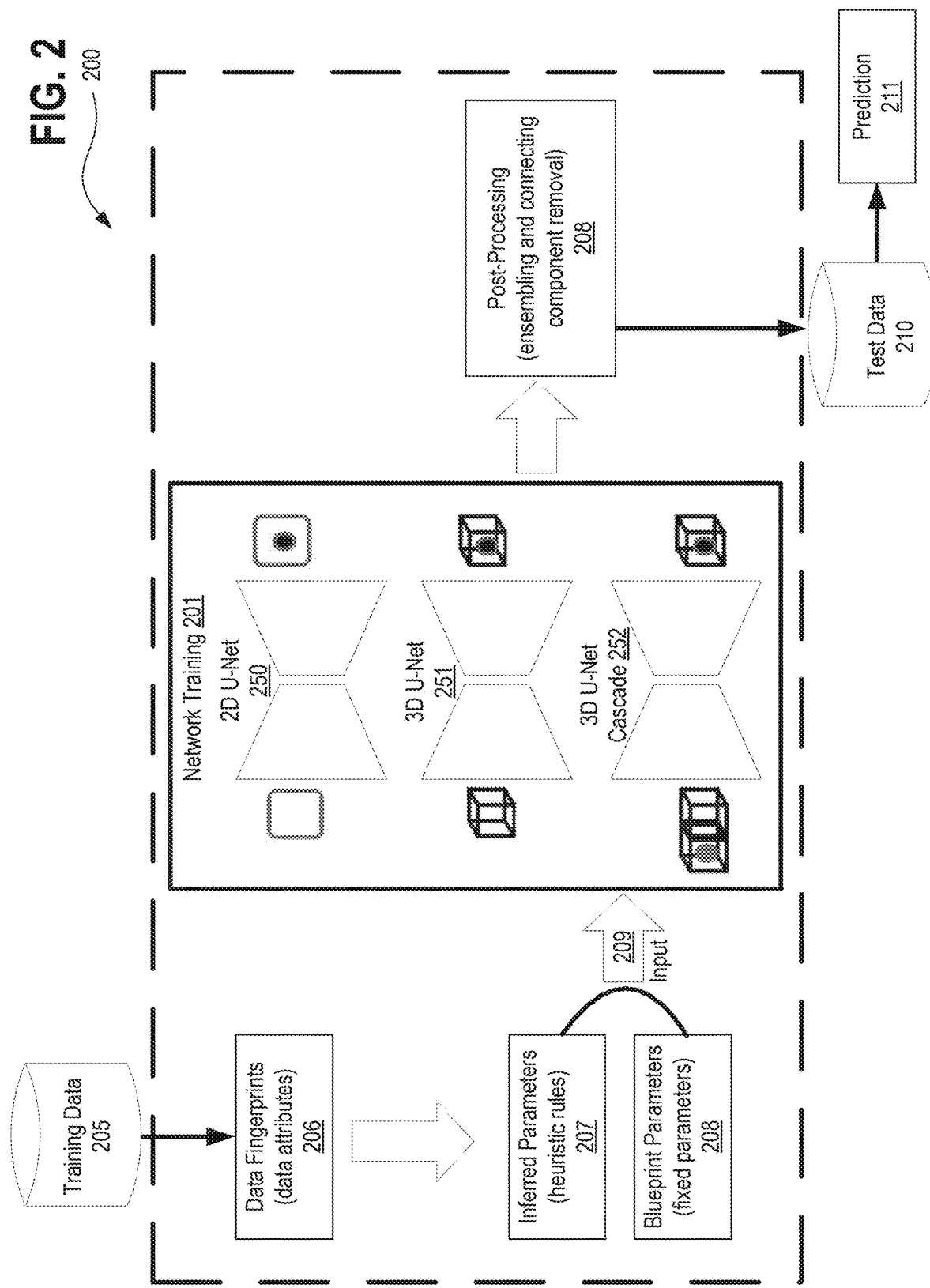
FIG. 2 depicts the automated design of the nnU-Net Framework.

FIG. 2 depicts the automated design of the nnU-Net Framework 200.

More particularly, inferred parameters heuristic rules 207 operate on data fingerprint 206. Blueprint parameters 208 and inferred parameters 207 together make the input 209 for network training 201. Three network architectures are trained based on the input from the framework in a 5-fold cross-validation way, including each of the 2D U-Net 250 network architecture, the 3D U-Net 251 network architecture, and the 3D U-Net Cascade 252 network architecture. Empirical parameters choose the optimal architecture based on the performance of validation data.

A brief description of individual components are depicted below:

1. Data Fingerprints: The data fingerprints 206 component of the framework 200 accumulates the dataset properties like image size, image spacing, modality, class label, etc. Further, the framework 200 utilizes these attributes in the pre-processing steps.

2. Blueprint Parameters: The blueprint parameters 208 decide the architecture template, training schedule, and inference choices. The framework employs original U-Net architecture. Large patch size is favored over batch size. The networks are trained for 1000 epochs with 250 iterations within each epoch. The Sum of cross-entropy and dice loss is used as a loss function. In order to handle class imbalance, each batch includes one patch from the foreground class, and another one is randomly sampled. Various data augmentation strategies are applied during training. Within the inference step, the sliding window approach is used for prediction.

3. Inferred Parameters: Unitizing inferred parameters 207, such as heuristic rules, an individual image, with its mean and standard deviation, is normalized using z-score normalization, excluding CT images. For CT images, 0.5 and 99.5 percentiles of the foreground pixels are clipped, followed by the global normalization scheme, using standard deviation and the mean of the whole dataset. To deal with heterogeneous voxel spacing, images are resampled to the target spacing using either third-order spline, linear or nearest-neighbor interpolation. The patch size is initialized as a median shape after resampling. Based on the patch size, the architecture is configured by determining the number of downsampling layers (until the feature map is reduced to 4 voxels). The patch size and architecture topology is adjusted in an iterative process until the GPU memory budget is met.

4. Empirical Parameters: The component ensembles and selects the best model configuration. The framework uses a fivefold cross-validation strategy to train individual configurations (2D U-Net (element 250), 3D U-Net (element 251), and 3D U-Net Cascade (element 252)) and selects either single or ensemble of two U-Net configurations. In post-processing at block 208, the framework 200 decides whether or not to remove all, but the largest connected component.

Ultimately, test data 210 is rendered as output from the framework 200 from which a prediction 211 is then made.

Based on experimental results, 3D U-Net (element 251) is the favored option for most of the tasks. In this work, experimental results demonstrate a performance gain using the 3D U-Net configuration from the nnU-Net framework alone.

Models Genesis—A Self-supervised Framework for 3D Medical Image Analysis: Fine-tuning pre-trained ImageNet models have become the de facto standard in classification and segmentation tasks. Even though such pre-trained ImageNet models provide a boost in the performance, they have the following limitations: First, the models use 2D images during training while, in medical imaging applications, most of the images are 3D, and solving 3D imaging target tasks in 2D might lose contextual information, resulting in low performance. Second, the models are supervised and use a large amount of labeled data. In medical imaging applications, acquiring such an amount of labeled data is expensive. And third, the models are trained on natural images.

Figure 3:
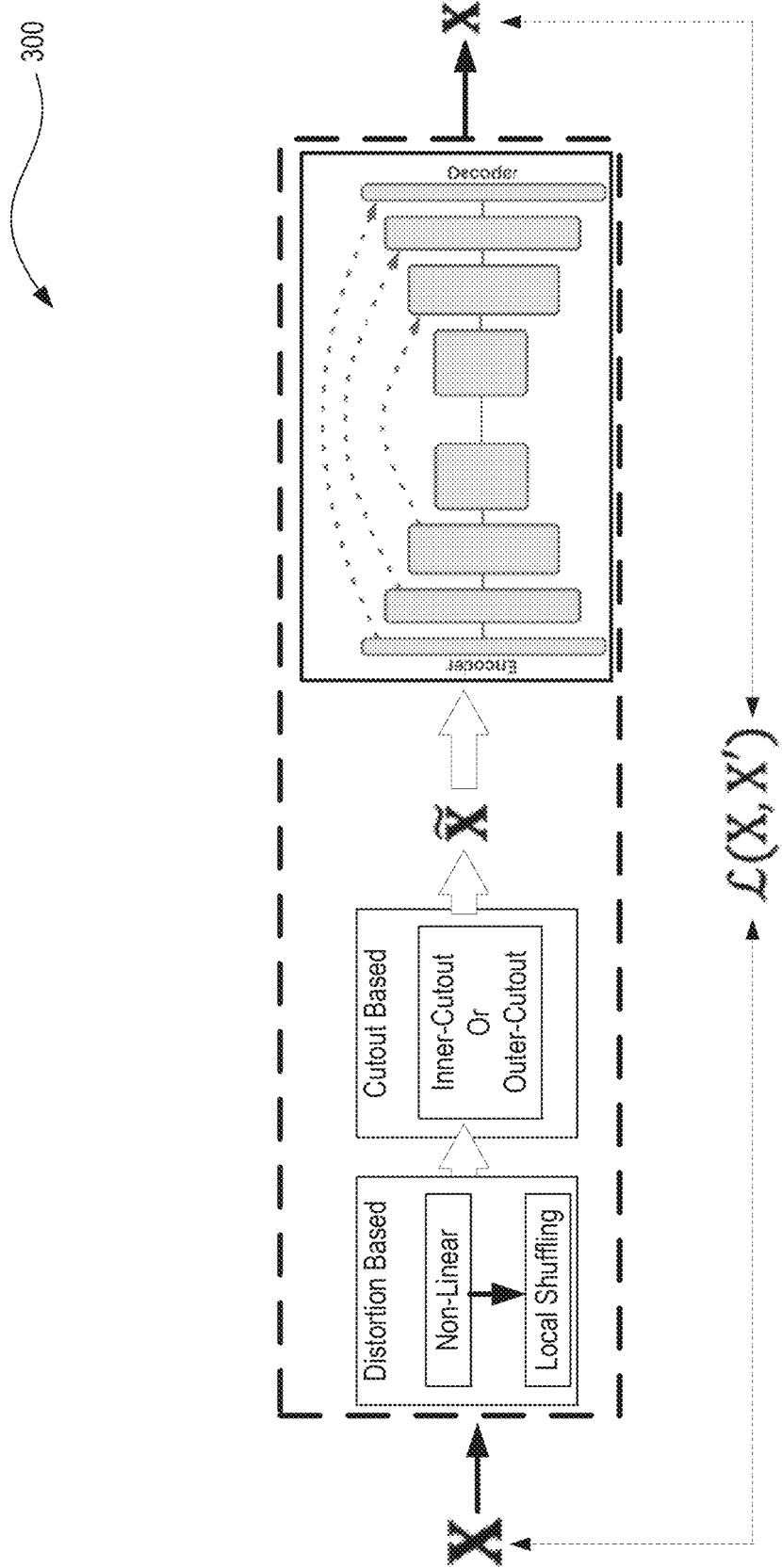
FIG. 3 depicts how an original image is transformed using distortion and cutout-based methods.

FIG. 3 depicts how an original image is transformed using distortion and cutout-based methods.

Specifically, the network learns the generic anatomical representation from the transformed image by recovering the original image. The network is trained to minimize the L2 distance between the prediction and ground truth.

To tackle the limitations described above, a set of pre-trained models named Models Genesis is utilized, which learns the generic anatomical patterns by utilizing a series of self-supervised strategies. As shown here, the predictive function is trained to learn the reconstruction of the original image from the transformed image using an encoder-decoder architecture.

The performance evaluation and experimental results show the significance of Models Genesis and its transferability beyond organs, diseases, and modalities in medical imaging applications. In contrast with the ImageNet pre-trained models, Models Genesis has the following advantages: Firstly, the models are self-supervised and utilizes most of the unlabelled data without any human annotation. Secondly, use of the models solves 3D imaging tasks in 3D instead of 2D, preserving rich 3D anatomical patterns. Thirdly, the models result in exceptional results as presented herein showing that the pre-trained models on medical images are more favorable and positively influence the target task as opposed to the pre-trained models on natural images.

In the training process of the proxy task, 3D patches from the image are extracted to go through transformation strategies. The 3D patches extracted from the images are used as the ground truth, while the transformed patches are used as the input to the architecture for the reconstruction task. To learn the generic representations, Models Genesis utilizes the below self-supervised transformation strategies:

1. Non-Linear Transformation: Models Genesis utilizes Bezier curve as transformation function on the input patch. It enables the model to learn organ appearances and intensity mapping.

2. Local pixel shuffling: Models Genesis samples a random window from the patch and then shuffles the pixels contained in it. This strategy helps the model to learn the texture and edges.

3. Cutout methods: Models Genesis implements outer-cutout and inner-cutout methods to learn the context present in the patch. For outer-cutout, random windows of different sizes are superimposed together, followed by randomly assigning the pixel values outside the window. Therefore, the outer-cutout learns the global geometry and spatial layout of the organs in the patch. For inner-cutout, pixel values inside the window are assigned with the constant value in order to learn the local context of organs in the patch.

Integrating Models Genesis in the nnU-Net Framework:

The nnU-Net framework is designed for 3D imaging tasks, while Models Genesis, being a self-supervised learning method, has out-performed 3D models trained from scratch. With the widespread success of the nnU-Net framework, the results on each task were reproduced and it was found that the performance of the framework is unstable due to the random initialization of weights. Based on the above observation, experimental results demonstrate that initializing the starting point of the nnU-Net architecture from Models Genesis will boost the nnU-Net performance. This is especially the case for those applications with limited annotation. This gain is attributed to learning representation from large scale medical images via self-supervision.

The nnU-Net framework trains three variations of architecture for each task i.e. 2D U-Net, 3D U-Net, and 3D U-Net Cascade as shown in FIG. 2. Based on experimental results, 3D U-Net is the most favorable option for 3D imaging tasks. Due to this reason, the 3D U-Net architecture was utilized, extracted from the nnU-Net framework, and demonstrated that the performance can be enhanced by fine-tuning Models Genesis for lung tumor, liver organ, and liver tumor segmentation tasks. According to a particular embodiment, only the proxy task utilizes only the LUNA16 dataset, implying that Models Genesis never sees any of the images from the target tasks. To learn the generic representation in the proxy task, the fixed-sized patches were first extracted from the LUNA16 dataset followed by z-score normalization based on the mean and standard deviation of the whole dataset. After pre-processing, the patches were transformed using the transformation strategies of Models Genesis. The transformed patch was then fed to the nnU-Net architecture in order to reconstruct the original patch. The network is trained to minimize the L2 distance between the predicted patch X' and ground truth X (e.g., the original patch without transformation), according to the following equation:

$$L(X)=\|f(X')-X\|_2^2 \qquad \text{Equation 1:}$$

Figure 4:
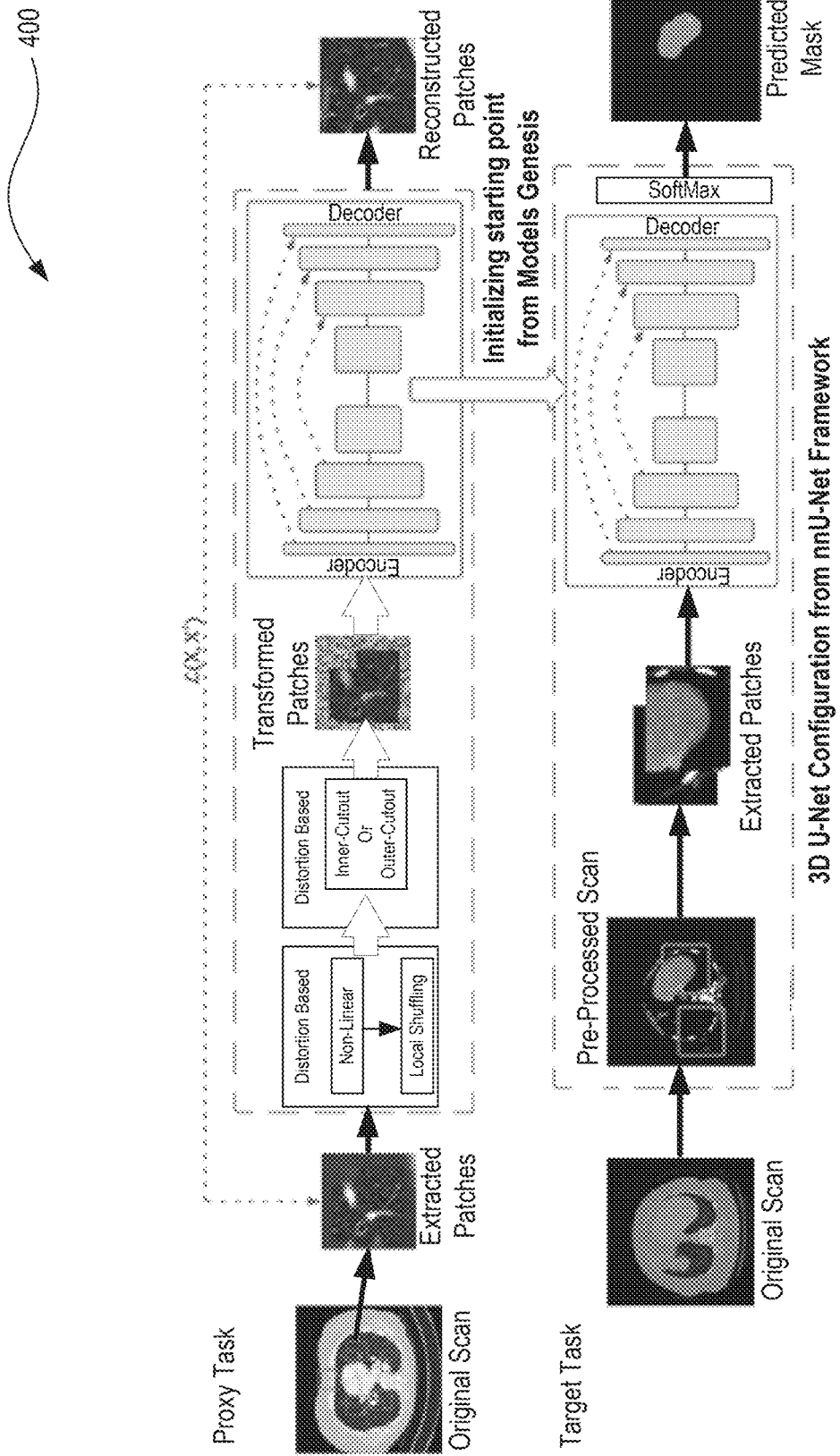
FIG. 4 depicts use of the 3D U-Net architecture configuration from the nnU-Net Framework, Models Genesis (top: Proxy Task) is trained.

FIG. 4 depicts use of the 3D U-Net architecture configuration from the nnU-Net Framework, Models Genesis (top: Proxy Task) is trained.

When the network converged, the Models Genesis were then further fine-tuned on the target task. The training and the fine-tuning process is depicted here. In the target task, the starting point of the nnU-Net framework is initialized from Models Genesis.

The main question that arose was: What architecture configuration may be utilized to train Models Genesis? The details are further examined, as follows:

The proxy task utilizes the LUNA16 dataset which was released with the motive to develop computer algorithms for lung cancer screening. To find the optimal architecture to train the proxy task, the differences between the ten tasks and their specific architectures were explored (refer to FIG. 7 below). It was observed that the Liver (Organ and Tumor) and Lung Tumor segmentation tasks use the same configuration with five layers in the encoder, one layer in a bottleneck, and five layers in the decoder. Apart from that, the proxy task dataset (LUNA16) was released with a similar motive as the lung tumor dataset provided by the Medical Segmentation Decathlon (2019) challenge. Due to this reason, the architecture configuration of the lung tumor segmentation task was used which was the same as the liver tumor segmentation task to train Models Genesis.

Figure 5:
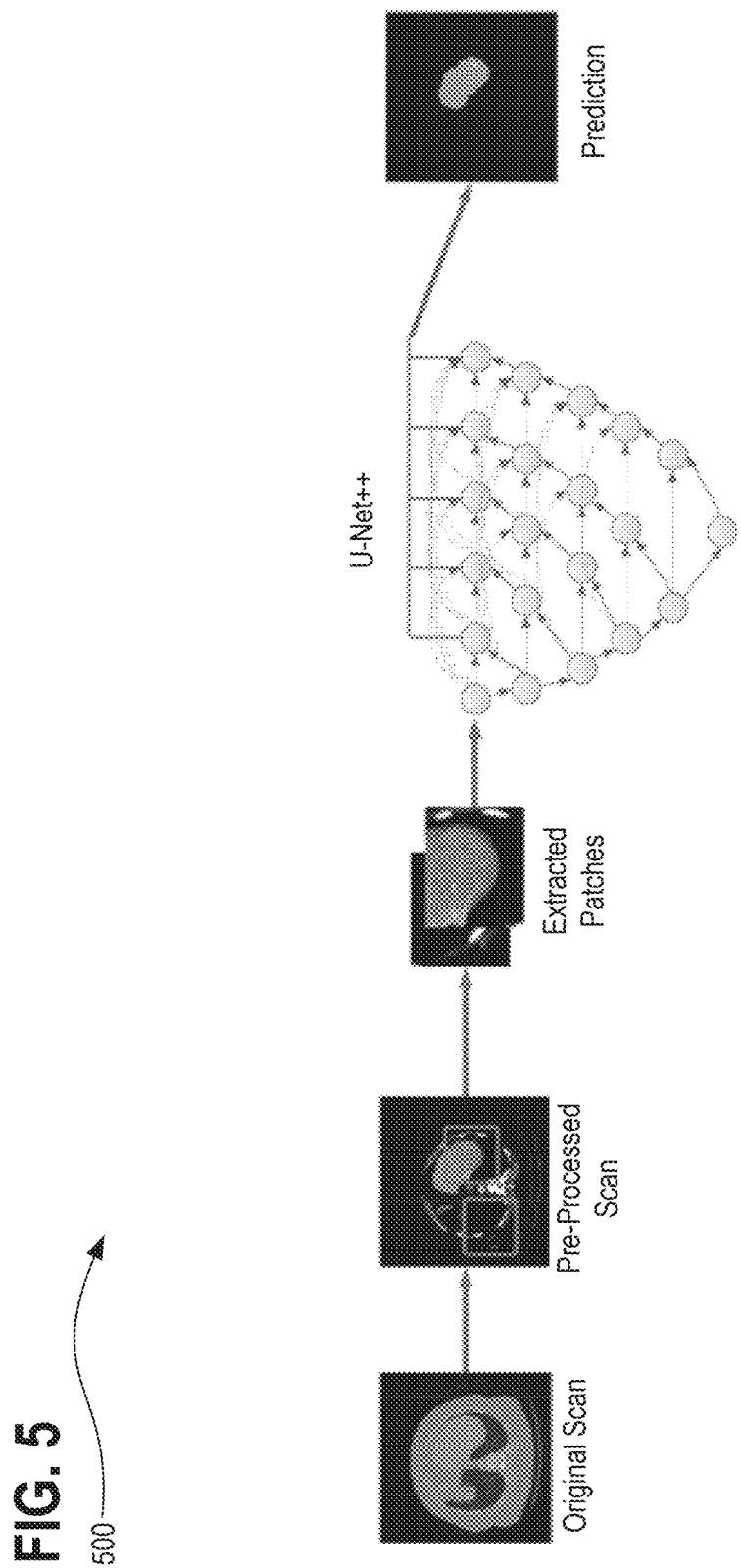
FIG. 5 depicts a 3D U-Net which is replaced by UNet++.

FIG. 5 depicts a 3D U-Net which is replaced by UNet++.

As shown here, the convolution blocks use the same configuration of 3D U-Net architecture obtained from the liver and liver tumor segmentation task pipeline in the nnU-Net framework.

Advancing Segmentation Architecture in the nnU-Net Framework:

The nnU-Net framework determines numerous specialized architectures based on U-Net. Even though the framework shows promising results, no study has been done to test the impact of other deep architectures. It is demonstrated herein that, by integrating deeper architecture in the framework, the performance on the specific task is enhanced. Experiments further demonstrated the hypothesis which is depicted here at FIG. 5, through refactoring the generic U-Net architecture to UNet++ for the liver organ and tumor segmentation tasks. Skip pathways in U-Net architecture connect the feature maps between encoder and decoder, directly resulting in fusing semantically dissimilar features. To avoid this, a deeply-supervised encoder-decoder network is used, where the encoder and decoder sub-networks are connected through a series of dense, nested skip pathways.

The redesigned skip pathways reduce the semantic gap between the features of the encoder and decoder sub-networks. According to disclosed embodiments, techniques implement UNet++ to learn multi-scale image features in the nnU-Net framework based on the liver organ and tumor segmentation architecture configuration i.e. backbone with five layers in the encoder and one layer in the bottleneck. Experiment shows that integrating deeper architecture can further boost the performance of a specific task. Utilizing a generic UNet++ architecture eliminates the need to ensemble numerous specialized architectures for a specific task.

FIG. 6 depicts Table 1 providing the properties of datasets provided by Medical Segmentation Decathlon (2019).

Experiments and Results:

Implementation and Dataset: In this work, the datasets provided by the Medical Segmentation Decathlon (2019) are utilized in the target task. The challenge spans over ten datasets (Refer to Table 1 at FIG. 6) belonging to different modalities. For the proxy task, the LUNA16 dataset was utilized. This dataset spans over 888 Chest CT scans.

Figure 7:
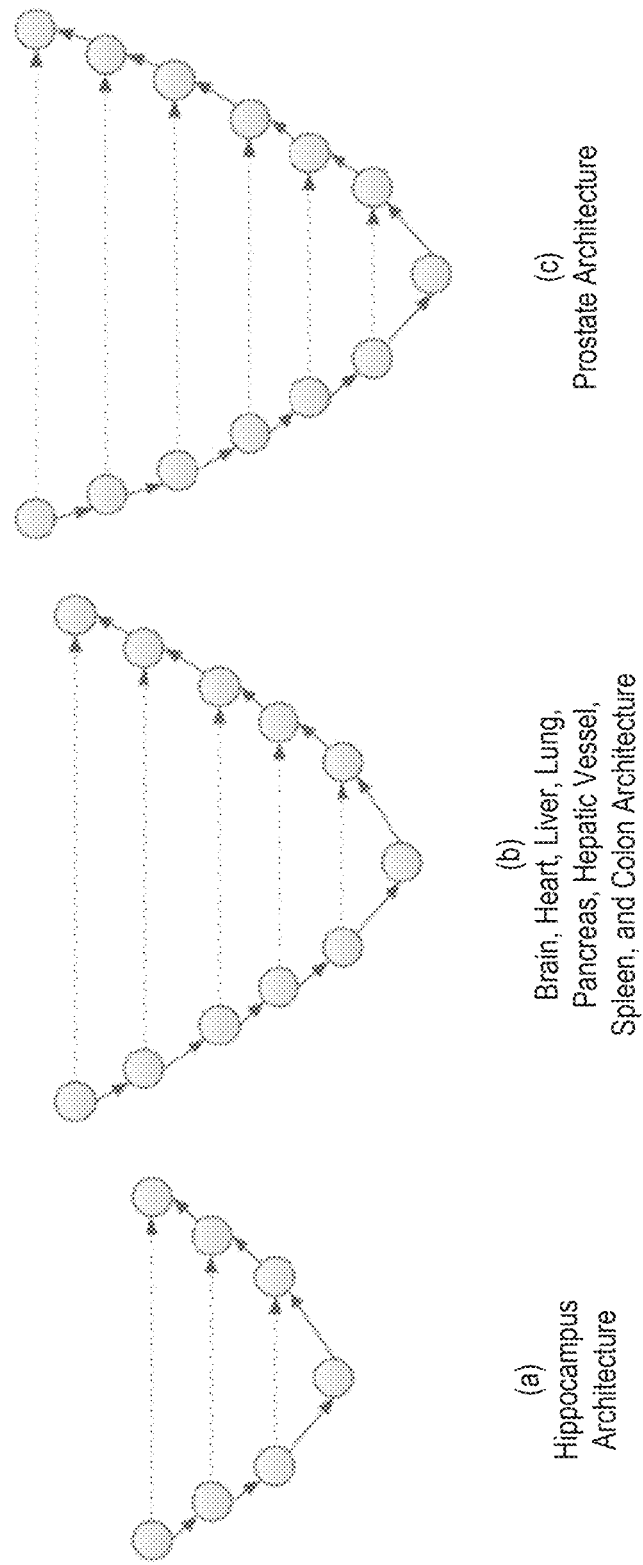
FIG. 7 depicts the depth of the architectures determined by the nnU-Net framework.

FIG. 7 depicts the depth of the architectures determined by the nnU-Net framework. More particularly, section (a) depicts the Hippocampus architecture, section (b) depicts the Brain, Heart, Liver, Lung, Pancreas, Hepatic vessel, Spleen, and Colon architecture. And lastly, section (c) depicts the prostate architecture. Note that all the architectures are determined by the nnU-Net framework.

Architecture Differences Between Tasks: The framework configures ten 3D U-Net architectures for ten datasets (refer to FIG. 7). All the architectures utilize a generic template with two convolution blocks within each layer. The difference in the architectures lies in the number of layers and the kernels within each layer. FIG. 7 shows that most of the architectures have five layers in the encoder, one layer in a bottleneck, and five layers in the decoder. Hippocampus dataset follows shallow architecture as depicted in FIG. 7, section (a) which depicts the Lung, Liver, Brain, Heart, Pancreas, Hepatic vessel, Spleen, and Colon dataset follow same depth in the architecture as determined by the nnU-Net framework (refer to FIG. 7 section (b)).

Even though they are similar, the prostate, pancreas, spleen, and colon differ in the first layer itself. The architecture determined for the Prostate dataset is the deepest depicted in FIG. 7, section (c). The architecture of the Brain Tumor Segmentation task looks similar to lung and liver architecture, however, the difference lies in the modality of these two tasks. Additionally, the Brain Tumor segmentation task belongs to the MRI domain and utilizes four modalities (T1, T1c, T2, and FLAIR) as input to the U-Net architecture, while lung and liver tasks belong to the CT domain with one modality in the input patch. Due to this reason, the transfer of weights in the first layer from Models Genesis becomes impossible. Furthermore, the impact of Models Genesis is demonstrated on all the target tasks.

According to particular embodiments, Models Genesis was trained using the patches extracted from 445 CT scans of the LUNA16 dataset and used 178 CT scans for validation. The remaining 265 scans were used for testing purposes in order to evaluate Models Genesis. A patch size of 64×64×32 was used as input to the 3D U-Net architecture. Note that no human annotation was utilized in the proxy task according to such an embodiment The architecture configuration is derived based on liver and lung datasets in the nnU-Net framework.

Target Tasks: The datasets in Table 1 (depicted at FIG. 6) correspond to the following segmentation tasks:

1. Brain Tumor Segmentation: The target task contains 484 training and 266 testing cases with the objective to segment 3 classes i.e. edema, active tumor and necrosis.

2. Heart Segmentation: This target task contains 20 training and 10 testing cases with the objective to segment the left ventricle.

3. Liver and Liver Tumor Segmentation: The target task contains 131 training and 70 testing cases with the objective to segment liver and liver tumors.

4. Hippocampus Segmentation: The target task contains 263 training and 131 testing cases with the objective to segment two neighbor small structures i.e. anterior and posterior hippocampus.

5. Prostate Segmentation: The target task contains 32 training and 16 testing cases with the objective to segment prostate central and peripheral zone.

6. Lung Tumor Segmentation: The target task contains 64 training and 32 testing cases with the objective to segment lung tumors.

7. Pancreas and Pancreas Cancer Segmentation: The target task contains 282 training and 139 testing cases with the objective to segment pancreas organ and pancreas cancer.

8. Hepatic Vessel and Tumor Segmentation: The target task contains 303 training and 140 testing cases with the objective to segment hepatic vessels and tumors.

9. Spleen Segmentation: The target task contains 41 training and 20 testing cases with the objective to segment the spleen organ.

10. Colon Cancer Segmentation: The target task contains 126 training and 64 testing cases with the objective to segment colon cancer.

Hyper-Parameters:

According to described embodiments, for the proxy task, all the patches were normalized using z-score normalization with a mean of −775.8 and a standard deviation of 251.9. These patches were then used as the input to 3D U-Net architecture. The mean squared error (L2 norm) was used as the loss function. The stochastic gradient descent method was used as an optimizer with a learning rate of 1e-1. The learning rate reduces by the use of a learning rate scheduler if validation loss does not decrease after certain epochs. In the target task, the same settings were utilized for the hyper-parameters as pre-defined by the nnU-Net framework.

Figure 8:
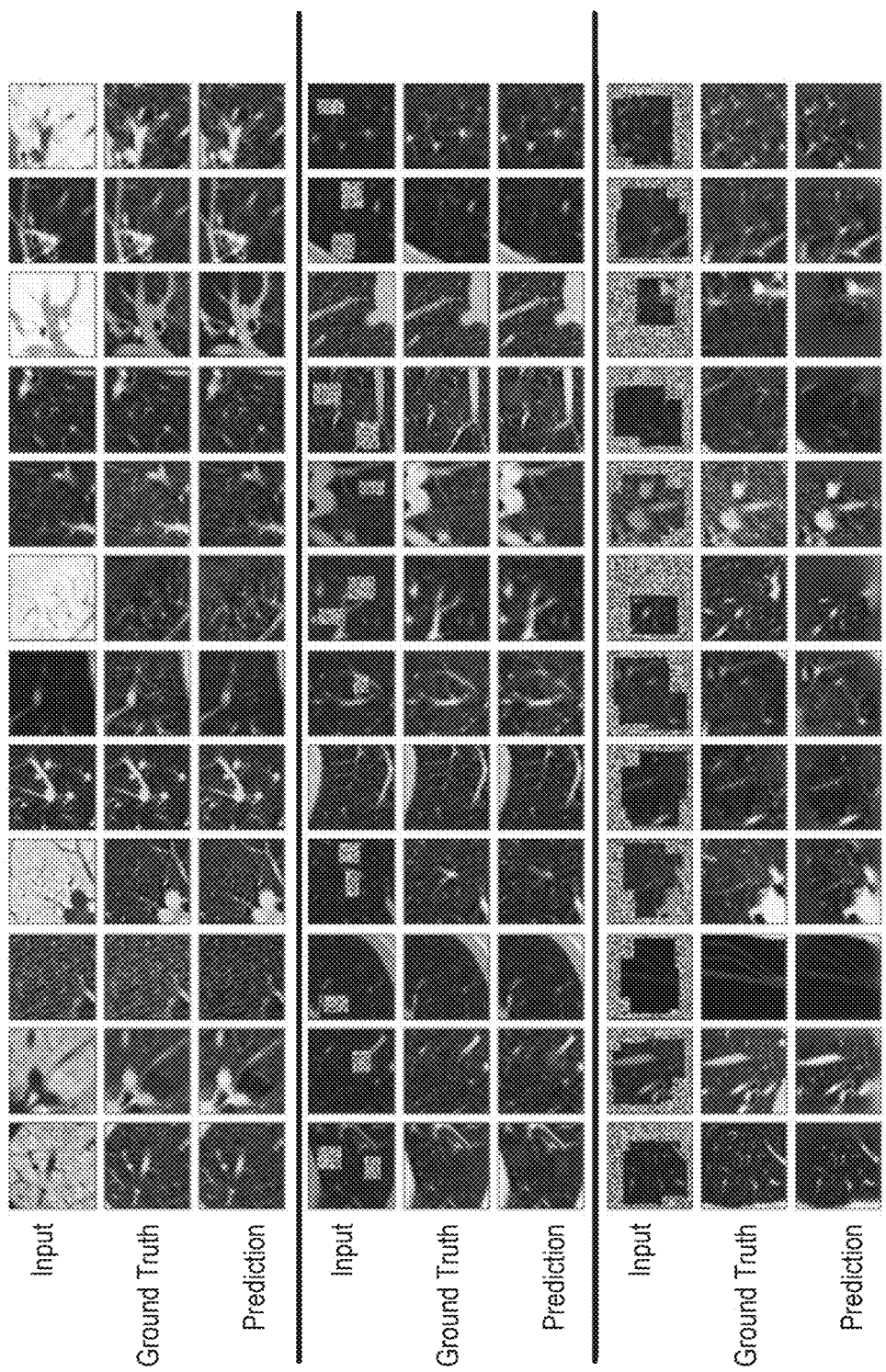
FIG. 8 depicts qualitative results of Models Genesis on the test set.

FIG. 8 depicts qualitative results of Models Genesis on the test set. Once Models Genesis was trained, it was evaluated on the test set using the patches reserved for testing purposes.

Models Genesis Results: Subsequent to training, Models Genesis was evaluated on the patches extracted from the scans reserved for testing purposes. None of the patches from the test set are seen by the model. FIG. 8 shows the reconstructed patches by Models Genesis and confirms that Models Genesis, indeed, learns the anatomical patterns from the large-scale images via self-supervision FIG. 9 depicts Table 2, Table 3, Table 4, and Table 5, providing various segmentation results.

Specifically, Table 2 depicts Liver and Liver Tumor Segmentation for Validation. Fine-tuning Models Genesis outperforms the nnU-Net framework trained from scratch. Scores depicted are Dice scores. Note: The best result is denoted in bold.

Table 3 depicts Liver and Liver Tumor Segmentation for the Test Set. Fine-tuning Models Genesis outperforms the nnU-Net framework trained from scratch. Scores depicted are Dice scores. Note: The best result is denoted in bold. Rank resembles the challenge leaderboard ranking.

Table 4 depicts Lung Tumor Segmentation or the Validation Set. Fine-tuning Models Genesis outperforms the nnU-Net framework trained from scratch. Scores depicted are Dice scores. Note: The best result is denoted in bold.

Table 5 depicts Lung Tumor Segmentation for the Test Set. Fine-tuning Models Genesis outperforms the nnU-Net framework trained from scratch. Scores depicted are Dice scores. Note: The best result is denoted in bold. Rank resembles the challenge leaderboard ranking.

Target Task Results: To evaluate Models Genesis, it was fine-tuned on using liver organ, liver tumor, and lung tumor segmentation tasks via transfer learning. All the layers were fine-tuned from encoder and decoder blocks in the above segmentation tasks. The weights were transferred for all except the last layer from the pre-trained model. The fine-tuned Models Genesis results were compared on the target tasks with training from scratch.

Tables 2 and 3 as presented (refer to FIG. 9) show the stable and enhanced results on liver and liver tumor segmentation tasks. Further, Models Genesis achieved the first rank in the liver tumor segmentation task on the challenge leaderboard.

Figure 10A:
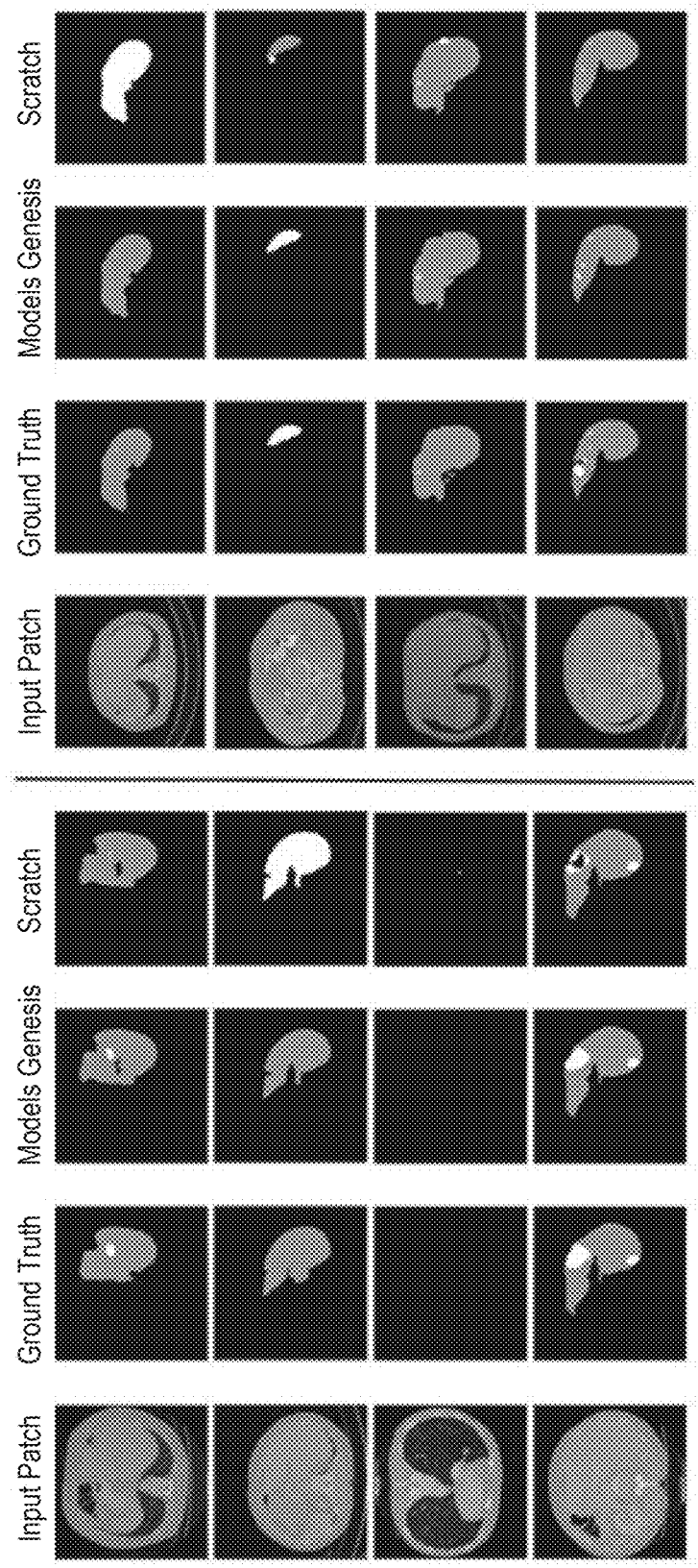
FIGS. 10A and 10B show that Models Genesis can effectively segment and find the liver tumor and lung tumor region in the CT scans while the nnU-Net framework standalone misses those regions or does not segment it efficiently.
Figure 10B:
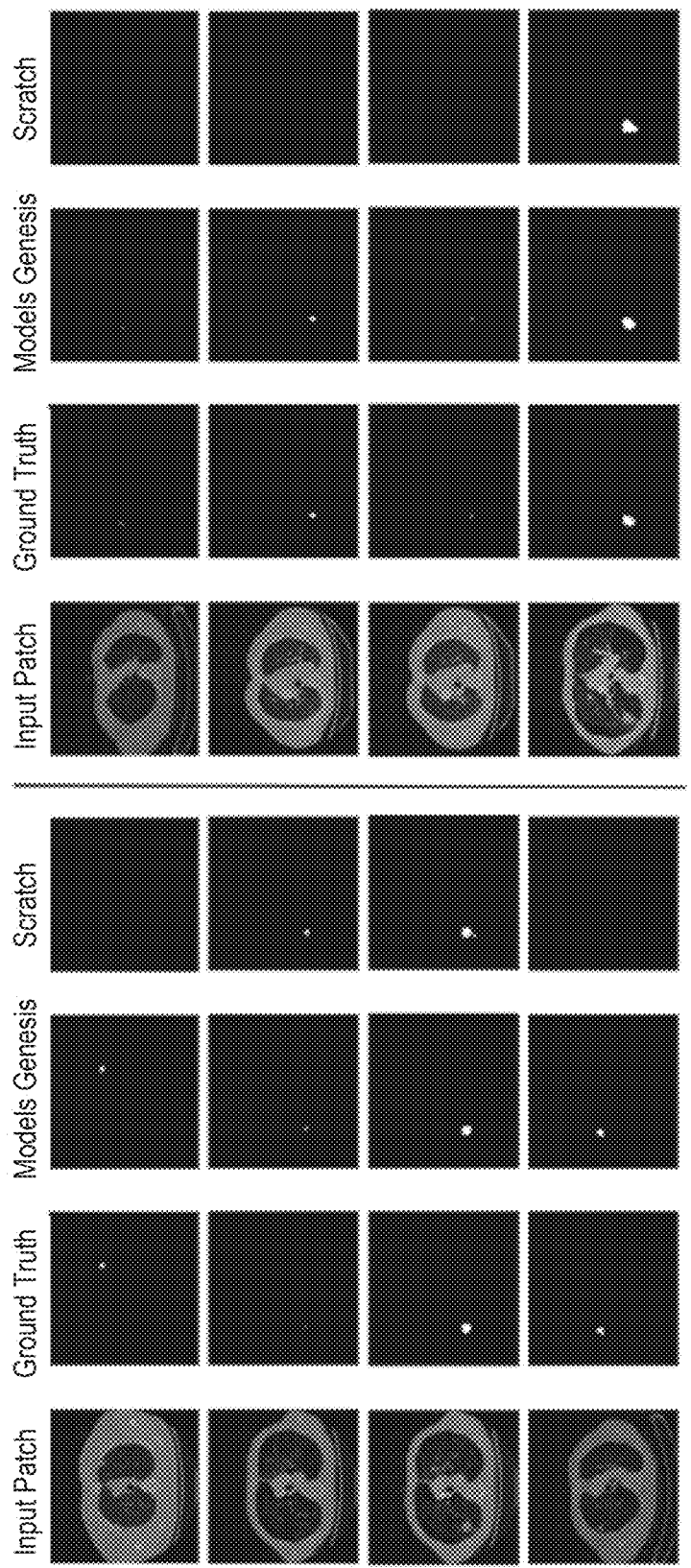

FIGS. 10A and 10B show that Models Genesis can effectively segment and find the liver tumor and lung tumor region in the CT scans while the nnU-Net framework standalone misses those regions or does not segment it efficiently.

For instance, FIG. 10A shows the qualitative results of Liver and Liver Tumor Segmentation Task. Once the Models Genesis is trained, it is fine-tuned on the target task. FIG. 10B shows the qualitative results of the Lung Tumor Segmentation Task.

Qualitative Results of Target Task: As shown in FIGS. 10A and 10B, Models Genesis can effectively segment and find the liver tumor and lung tumor region in the CT scans while the nnU-Net framework standalone misses those regions or does not segment it efficiently.

Figure 11A:
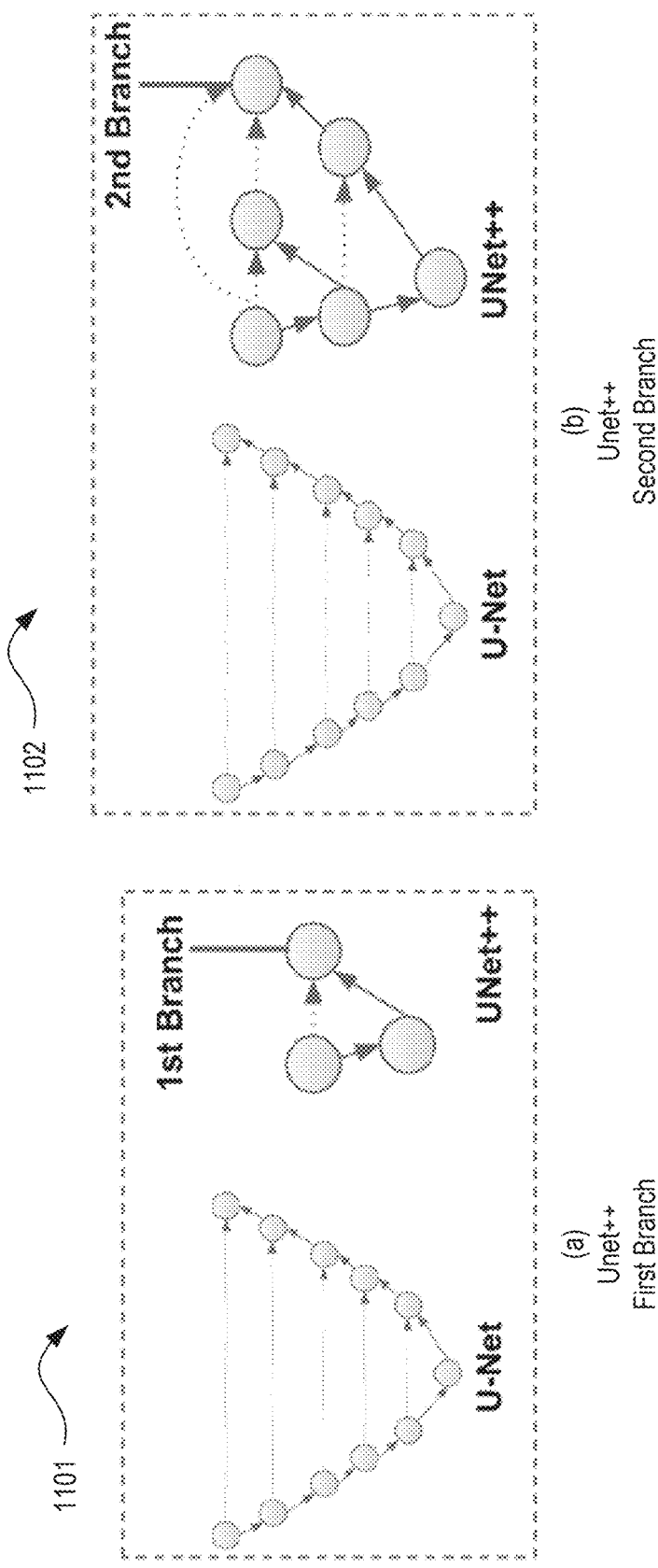
FIGS. 11A, 11B, and 11C depict multiple exemplary Branches of UNet++ Architecture.
Figure 11B:
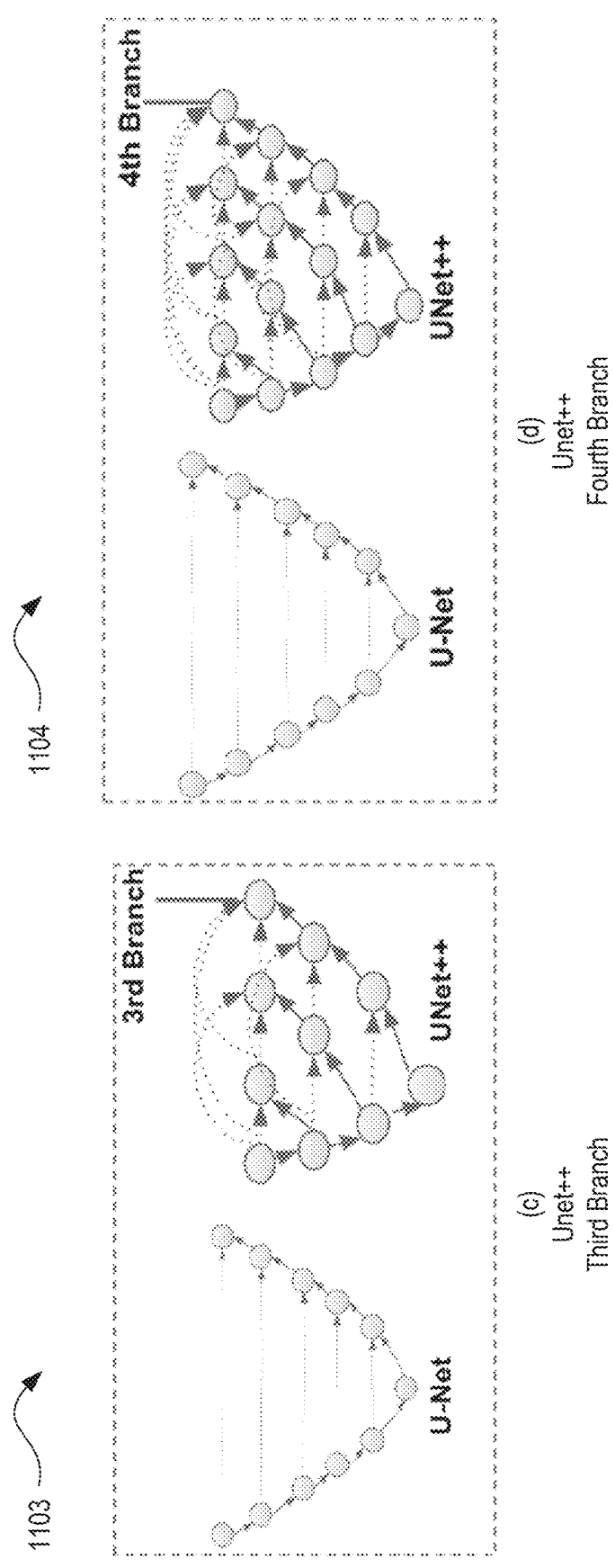
Figure 11C:
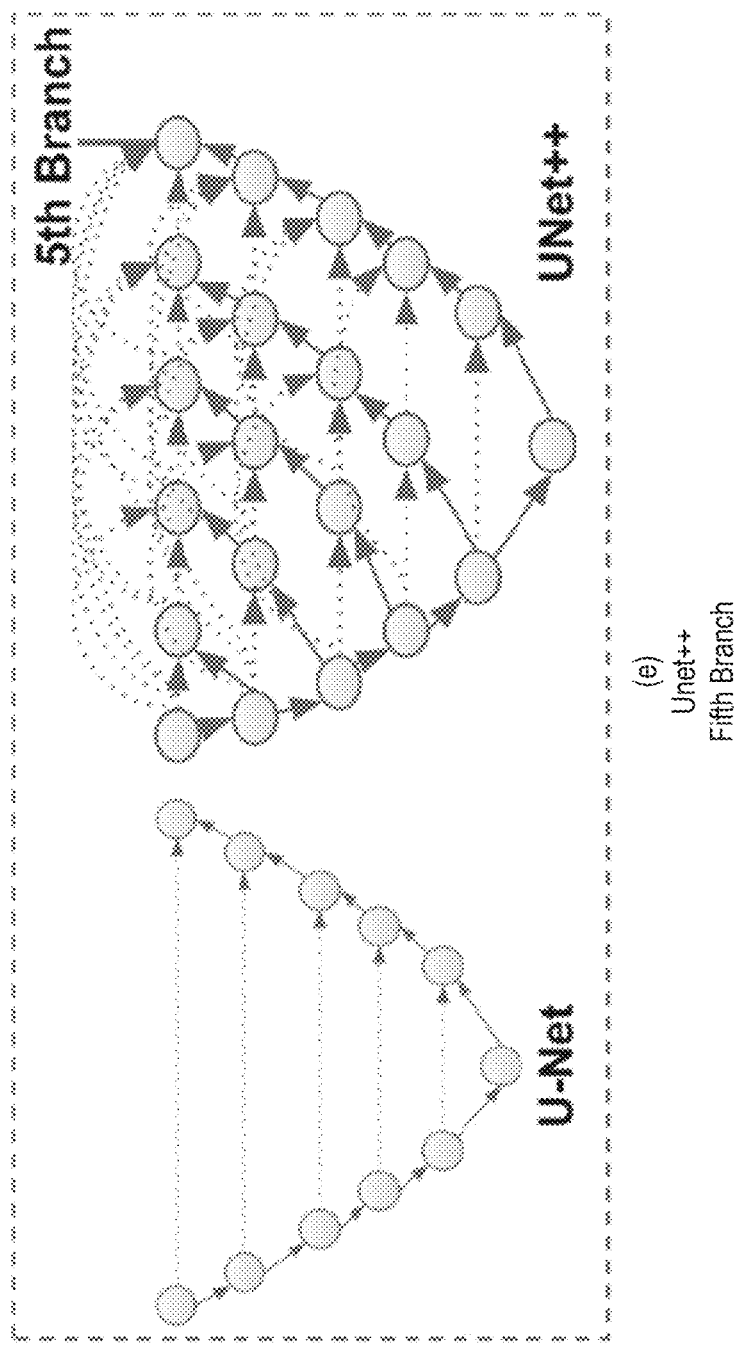

FIGS. 11A, 11B, and 11C depict multiple exemplary Branches of UNet++ Architecture. Specifically, a first branch of UNet++ is depicted at element 1101 at FIG. 11A, a second branch of UNet++ is depicted at element 1102 at FIG. 11A, a third branch of UNet++ is depicted at element 1103 at FIG. 11B, a fourth branch of UNet++ is depicted at element 1104 at FIG. 11B, and a fifth branch of UNet++ is depicted at element 1105 at FIG. 11C. Notably, described embodiments compare individual branches in the experiment with U-Net architecture in the nnU-Net framework.

Results of UNet++ in the nnU-Net Framework:

More specifically, U-Net architecture was replaced in the nnU-Net framework with UNet++. For implementation, the same kernel shapes and layers were used from liver architecture as determined by the nnU-Net framework. Additionally, encoder-decoder sub-networks were injected. The architecture contains five layers in the encoder, one layer in a bottleneck, and five layers in the decoder. The implementation is depicted in FIG. 5.

FIG. 12 depicts Table 6 which depicts both Liver and Liver Tumor Segmentation. The pipeline determined by the nnU-Net framework is used in the experiments. The only difference is in segmentation architecture. Training is done using random initialization of weights. Scores depicted are Dice scores. Note that the best result is denoted in bold.

More specifically, Table 6 shows the gained performance using UNet++ architecture instead of U-Net in the nnU-Net framework. The U-Net++ branch refers to encode-decoder sub-network predictions (FIG. 4.5). The performance of UNet++ on the liver organ is similar to U-Net architecture while there is a significant improvement in liver tumor scores. As the encoder-decoder sub-network deepens the performance improves. In this way, UNet++ learns multi-scale image features. This experiment demonstrates that using advanced segmentation architecture in the nnU-Net framework can further improve the performance on a specific task.

Figure 13:
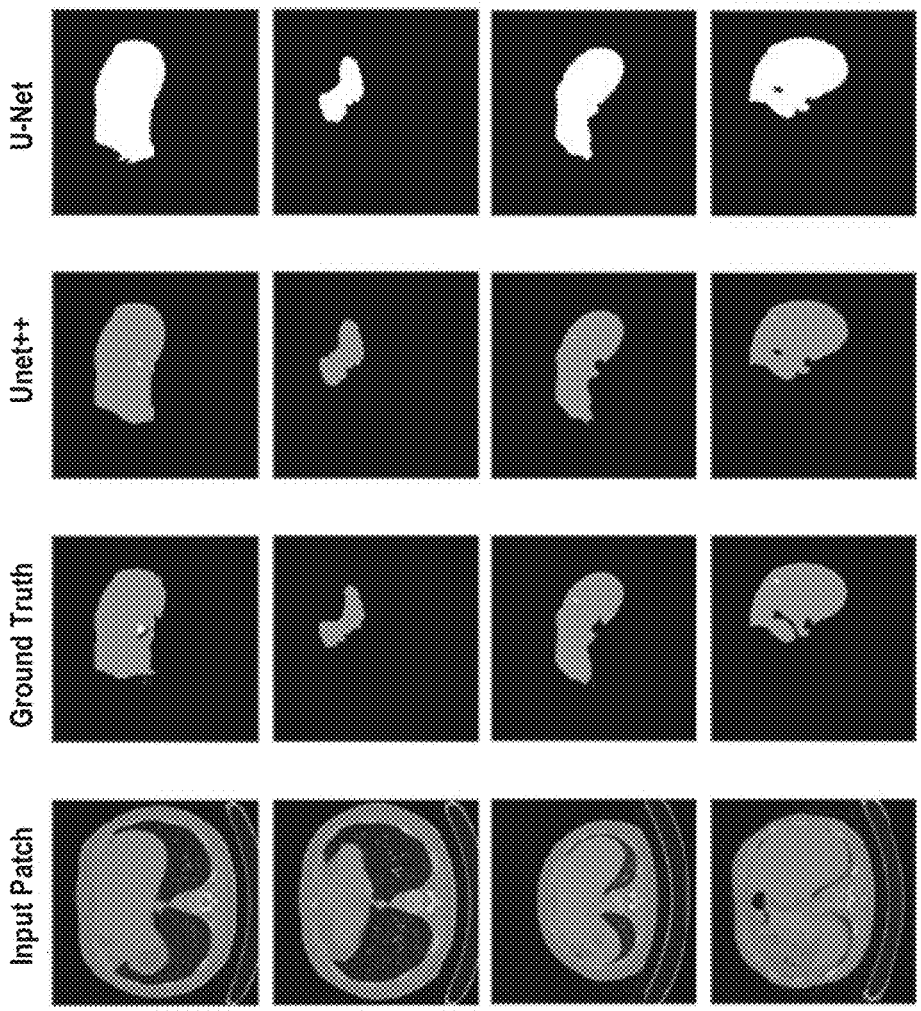
FIG. 13 depicts qualitative results of Liver Tumor Segmentation Task using UNet++ in the nnU-Net framework.

FIG. 13 depicts qualitative results of the Liver Tumor Segmentation Task using UNet++ in the nnU-Net framework. The results for UNet++ are based on the best branch i.e. 5th branch as depicted in FIG. 11C at element (e).

Qualitative Results of UNet++ Integrated Into the nnU-Net Framework for the Liver Tumor Segmentation Task: As shown in here, UNet++ architecture in the nnU-Net framework can effectively segment and find the liver tumor region in the CT scans while U-Net architecture in the nnU-Net framework misses those regions or does not segment it efficiently.

Figure 14A:
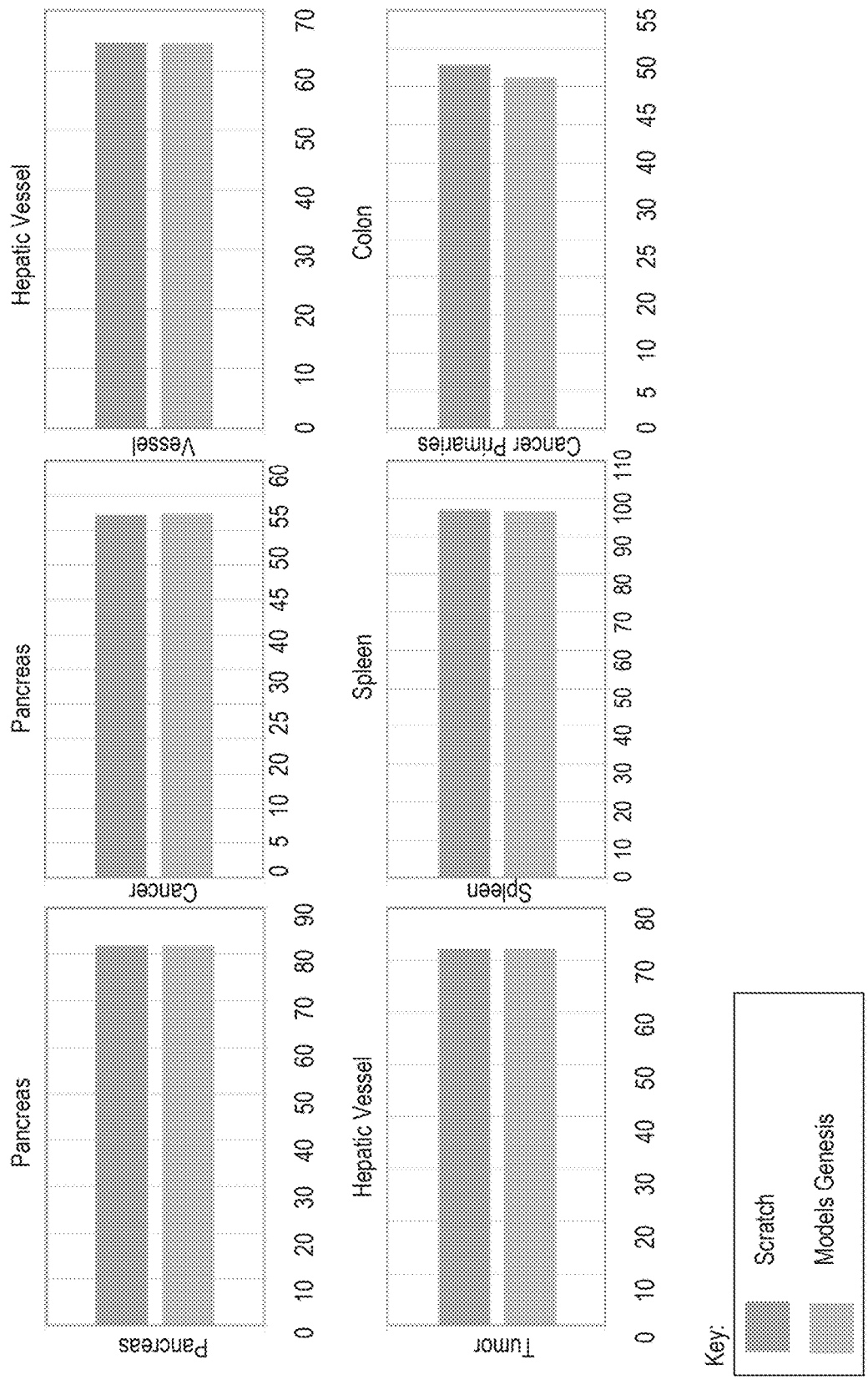
FIGS. 14A, 14B, and 14C depict a chart in which the X-axis denotes Dice scores on the target task.
Figure 14B:
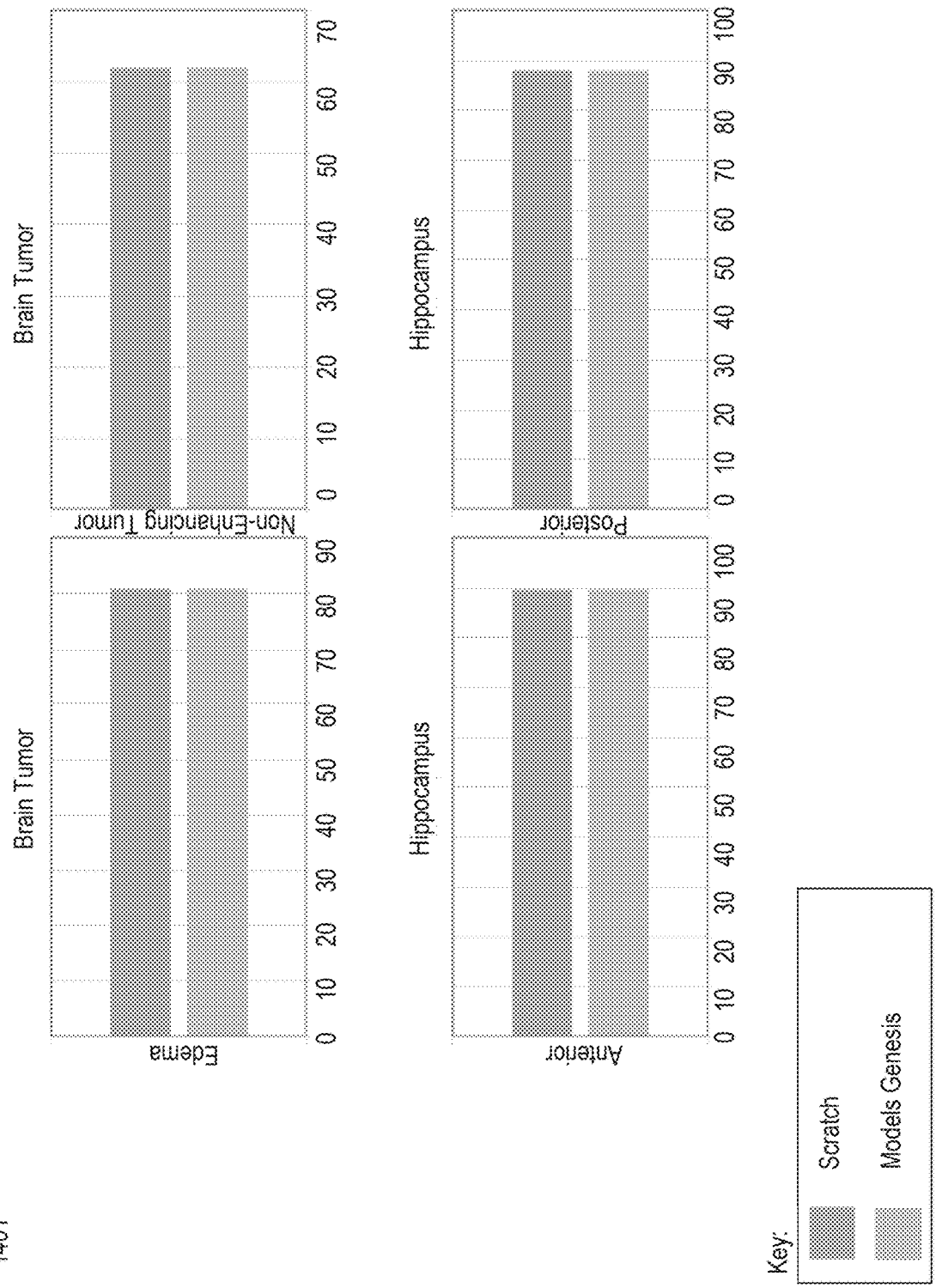
Figure 14C:
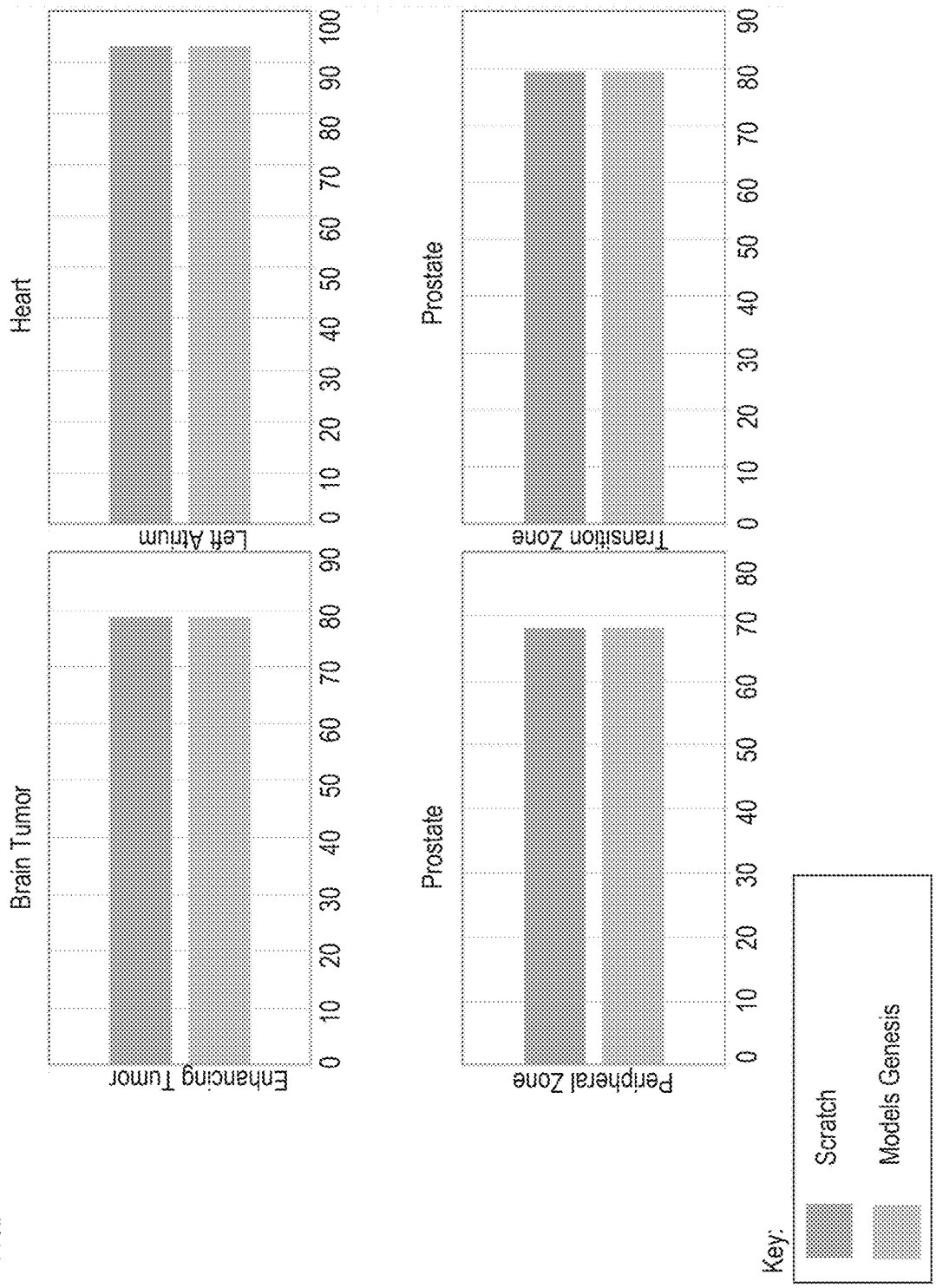

FIGS. 14A, 14B, and 14C depict a chart in which the X-axis denotes Dice scores on the target task. An evaluation of Models Genesis trained using Lung architecture and the LUNA16 dataset on the target tasks. The architecture of the target task is determined by the nnU-Net framework as conducted.

Discussion

Target Task Results on the Other Datasets in CT Domain: Even though there was an architecture difference between Models Genesis and the rest of the tasks belonging to the CT domain, the impact of the weight transfer on them was nevertheless evaluated. Pancreas, Spleen, and Colon architecture's first layer is different from the architecture of the proxy task. FIG. 14A shows that the target task performance using the starting point from Models Genesis is similar to training from scratch. The results show the importance of the initial layers of the pre-trained model. Due to no weight transfer for them, the architecture trains similar to training from scratch.

Is there a need for multiple architectures: The multiple architectures determined by the nnU-Net framework make it impossible to initialize the starting point from Models Genesis on the target task. Due to the variations in the architecture, the prior knowledge gained by Models Genesis comes to no use in the target task performance. Due to this, the following question arises: Is it possible to utilize a generic architecture for all the tasks?

As shown in the experiment section, the architecture of the target tasks in the CT domain shares the same kernels in all, except the first layer. The above observation implies that the proxy task architecture is close enough to the rest of the target task architectures in the CT domain, however, the first layer difference contributes more to the training from scratch. Hence, replacing the first layer in the target tasks architecture with Models Genesis architecture will be required to utilize the prior knowledge gained by Models Genesis. Further, integrating UNet++ in the nnU-Net framework helps in learning the multi-scale image features and eliminates the need for multiple architectures for a specific task. This implementation can be extended via implementing UNet++ to learn multiple features to span across multiple tasks. Future work may further develop this hypothesis in order to create a generic architecture for multiple tasks, further utilizing the prior knowledge gained by the proxy task.

Cross Domain Transfer: Transfer learning positively influences the performance of the target task in the similar domain with the similar architecture of the proxy task. The proxy task was trained using the LUNA16 dataset belonging to the CT domain. The trained Models Genesis does not seem to provide significant improvement for the target tasks in the MR domain.

FIG. 14B depicts a chart in which the X-axis denotes Dice scores on the target task. Models Genesis was evaluated having been trained using Lung architecture and LUNA16 dataset on the target tasks, belonging to the MR domain. The architecture of the target task is determined by the nnU-Net framework.

More specifically, FIG. 14B shows that Models Genesis gives similar performance as training from scratch. The Brain tumor dataset has four modalities in each MR scan which causes the input patch for the architecture to have four sequences. On the other hand Models Genesis is trained using only one sequence based on the LUNA16 dataset. Due to this reason, the weight transfer for the first layer does not initiate. The initial layers of the pre-trained model make a considerable impact on the target task. Hence, the architecture trains similar to the randomly initialized model. Similar observations were found for the Hippocampus segmentation task. The architecture for the same is shallow with only three layers in the encoder and one layer in the bottleneck while the Genesis architecture contains five layers in the encoder and one layer in the bottleneck. This creates a huge difference in the architectures of proxy and target tasks, leading to performance similar to training from scratch.

The other reason for no improvement is the domain difference between the proxy task dataset (LUNA16) and the target task datasets. The LUNA16 dataset belongs to the CT domain while the Brain tumor dataset belongs to the MR domain. Similar domain differences can be found in Heart, Hippocampus, and Prostate datasets. The significant domain difference requires a new Model Genesis trained on the MR domain. However, CT images have a standard scale (Hounsfield Unit), while in MR images, the variation in the scanners causes inconsistent tissue intensities. Due to this reason, the non-linear transformation in Models Genesis does not work well with MR images. Hence, future work is required to find the transformation strategy for images in the MR domain.

Importance of the Normalization Strategy:

The nnU-Net framework highly relies on the ground truth while building the pipeline. The normalization strategy only collects the intensity values from foreground region pixels in the raw scans. Based on the intensity values collected, the framework applies z-score normalization on the individual scans. To reduce the use of ground truth, the intensity clipping and z-score normalization strategy of the nnU-Net framework was replaced with the intensity clip in the range of [−325,325], followed by image normalization between [−1,1]. Further, liver and liver tumor segmentation tasks were trained from scratch using the above strategy. Note that this experiment was done as a proof of concept to evaluate the normalization strategy.

Figure 15:
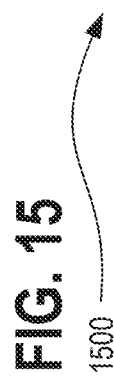
FIG. 15 depicts Table 7 showing Liver and Liver Tumor Segmentation. The only change while determining the above results which are captured by Table 7 is in the pre-processing step.

FIG. 15 depicts Table 7 showing Liver and Liver Tumor Segmentation. The only change while determining the above results which are captured by Table 7 is in the pre-processing step. Intensity clipping and z-score normalization, in the nnU-Net framework, are done based on the intensity values captured from the foreground pixels. [−1,1] is done based on the clip between [−325,325] (no use of ground truth). Scores depicted are Dice scores. Note also that the best result is denoted in bold.

As shown in Table 7, the standard clipping of [−325,325] followed by the raw scan scaling between [−1,1] does not affect the performance.

Some of the limitations in the nnU-Net framework are therefore addressed and described methodologies are set forth to overcome those limitations. First, the pre-trained model for the nnU-Net framework is proposed in order to enhance the performance of the target tasks provided by the Medical Segmentation Decathlon (2019) challenge. This work shows the importance of transfer learning for tasks with limited data. Experimental results demonstrate that, by fine-tuning Models Genesis based on the architecture determined by the nnU-Net framework, the performance of liver and lung tumor segmentation tasks improved significantly. This performance gain is attributed to the scalable, generic, robust image representation learned from the consistent and recurring anatomical structure embedded in medical images. Further, Models Genesis helped in achieving the first rank in liver tumor segmentation task and third rank in lung tumor segmentation task.

Due to the outstanding performance of Models Genesis, the same architecture may also be utilized by the proxy task for the target tasks with different architecture. Additional experiments in the discussion section suggest utilizing transfer learning within similar architecture and similar domains.

Secondly, it was observed that by introducing a more advanced segmentation architecture, such as UNet++, performance of the liver tumor segmentation task was improved. This eliminates the need for numerous specialized architectures and further eliminates the need of ensembling multiple architectures. In future work, UNet++ may be evaluated as a generic architecture to learn the multiple features to span across multiple tasks.

Figure 16A:
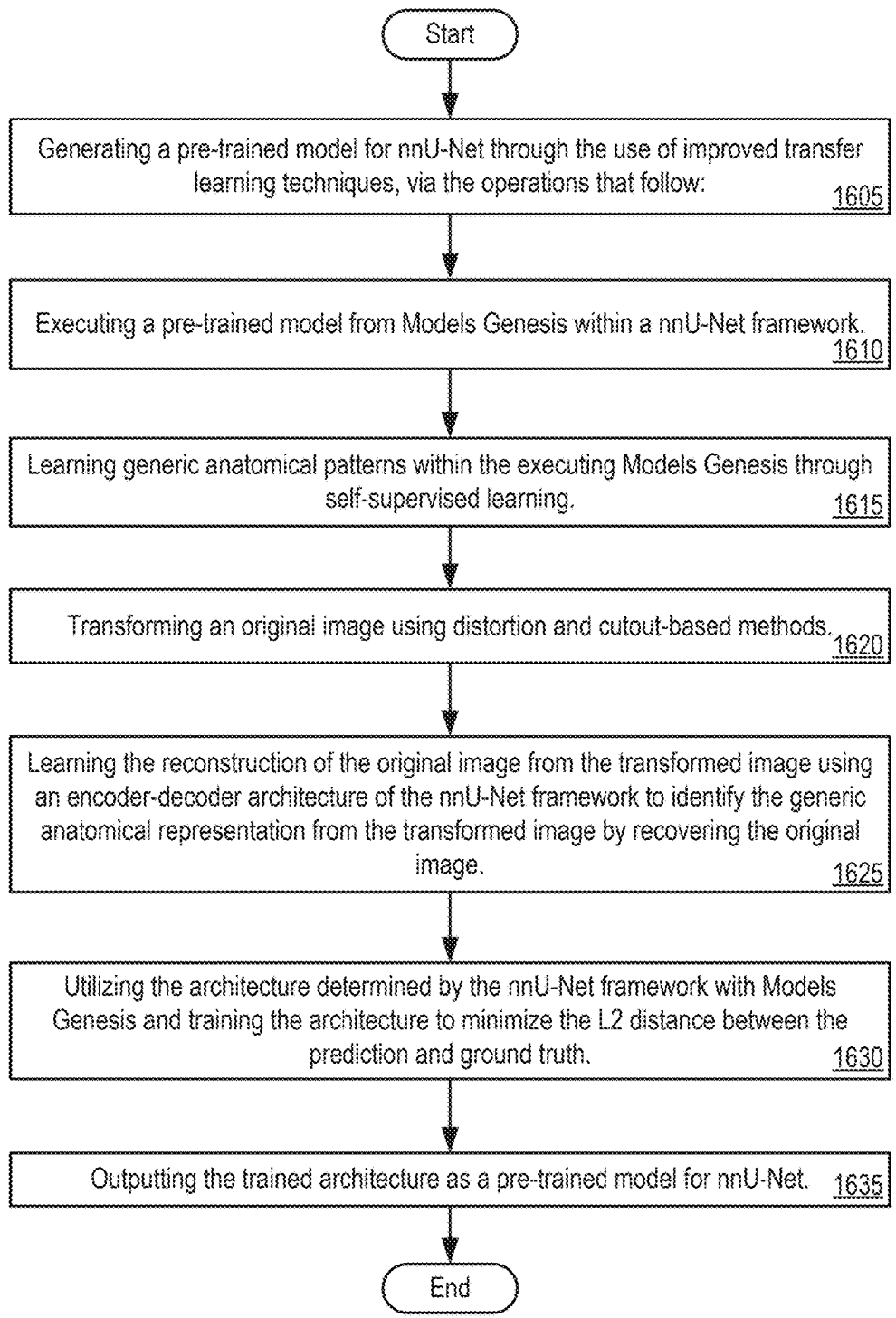
FIGS. 16A and 16B depict flow diagrams illustrating methods for generating pre-trained models for nnU-Net through the use of improved transfer learning techniques, in accordance with disclosed embodiments.
Figure 16B:
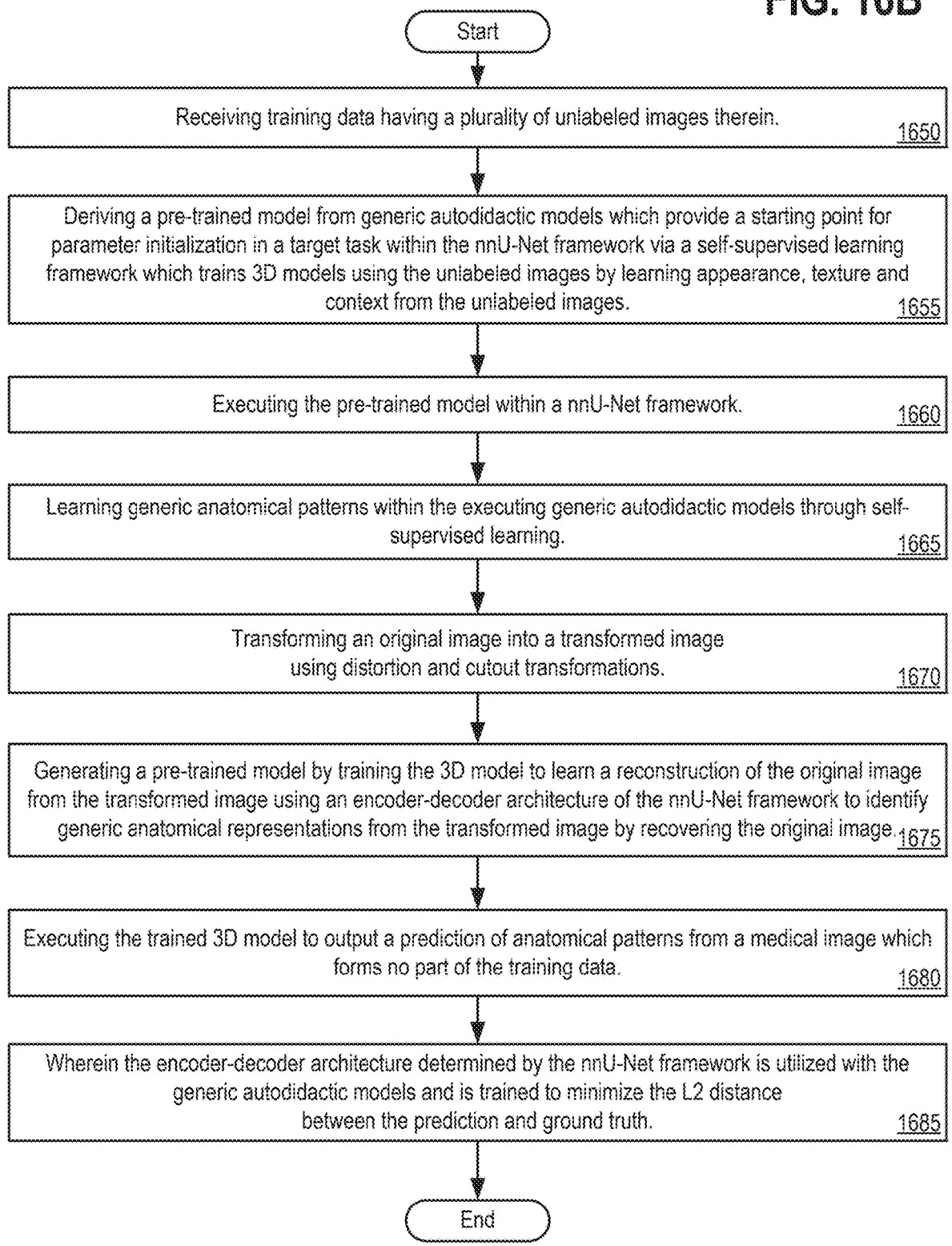

FIGS. 16A and 16B depict flow diagrams illustrating methods 1600 and 1601 for generating pre-trained models for nnU-Net through the use of improved transfer learning techniques, in accordance with disclosed embodiments. Method 1600 and 1601 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1701 (see FIG. 17) and the machine 1801 (see FIG. 18) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1600 depicted at FIG. 16A, there is a method performed by a system specially configured for systematically generating pre-trained models for nnU-Net through the use of improved transfer learning techniques, in accordance with disclosed embodiments. Such a system may be configured with at least a processor and a memory to execute specialized instructions which cause the system to perform the following operations:

At block 1605, processing logic of such a system generates a pre-trained model for nnU-Net through the use of improved transfer learning techniques, via the operations that follow.

At block 1610, processing logic executes a pre-trained model from Models Genesis within a nnU-Net framework.

At block 1615, processing logic learns generic anatomical patterns within the executing Models Genesis through self-supervised learning.

At block 1620, processing logic transforms an original image using distortion and cutout-based methods.

At block 1625, processing logic learns the reconstruction of the original image from the transformed image using an encoder-decoder architecture of the nnU-Net framework to identify the generic anatomical representation from the transformed image by recovering the original image.

At block 1630, processing utilizes the architecture determined by the nnU-Net framework with Models Genesis and trains the architecture to minimize the L2 distance between the prediction and ground truth.

At block 1635, processing logic outputs the trained architecture as a pre-trained model for nnU-Net.

With reference to the method 1601 depicted at FIG. 16B, there is a method performed by a system having at least a processor and a memory therein, wherein the system is specially configured for generating a trained 3D model and outputting a prediction, in which specialized instructions cause the system to perform the following operations:

At block 1650, processing logic training data having a plurality of unlabeled images therein.

At block 1655, processing logic derives a pre-trained model from generic autodidactic models which provide a starting point for parameter initialization in a target task within the nnU-Net framework via a self-supervised learning framework which trains 3D models using the unlabeled images by learning appearance, texture and context from the unlabeled images.

At block 1660, processing logic executes the pre-trained model within a nnU-Net framework.

At block 1665, processing logic learns generic anatomical patterns within the executing generic autodidactic models through self-supervised learning.

At block 1670, processing logic transforms an original image into a transformed image using distortion and cutout transformations.

At block 1675, processing logic generates a pre-trained model by training the 3D model to learn a reconstruction of the original image from the transformed image using an encoder-decoder architecture of the nnU-Net framework to identify generic anatomical representations from the transformed image by recovering the original image.

At block 1680, processing logic executes the trained 3D model to output a prediction of anatomical patterns from a medical image which forms no part of the training data.

At block 1685, the system which executes the method is configured such that the encoder-decoder architecture determined by the nnU-Net framework is utilized with the generic autodidactic models and is trained to minimize the L2 distance between the prediction and ground truth.

According to another embodiment of method 1600-1061, the nnU-Net framework comprises a supervised adaptive framework which applies random parameter initialization within a generic U-Net's encoder-decoder architecture to perform image segmentation for an input image.

According to another embodiment of method 1600-1061, deriving the pre-trained model from generic autodidactic models comprises deriving the pre-trained model from Models Genesis to provide the starting point for parameter initialization in the target task within the nnU-Net framework.

According to another embodiment of method 1600-1061, the self-supervised learning comprises Non-Linear Transformation in which a Bezier curve is applied as transformation function on an input patch of the original image to enable the model to learn organ appearances and intensity mapping.

According to another embodiment of method 1600-1061, the self-supervised learning comprises applying local pixel shuffling to sample a random window from an input patch of the original image which are captured as sampled images and then further wherein the local pixel shuffling shuffles the pixels contained in the captured sample images to enable the model to learn textures and edges of organs.

According to another embodiment of method 1600-1061, the self-supervised learning comprises applying cutout methods including implementing an outer-cutout method and an inner-cutout method to enable the model to learn the context present in an input patch of the original image.

According to another embodiment of method 1600-1061, the outer-cutout method includes random windows of different sizes being superimposed together followed by randomly assigning the pixel values outside the window to enable the outer-cutout method to learn the global geometry and spatial layout of the organs in each input patch.

According to another embodiment of method 1600-1061, the inner-cutout method includes assigning pixel values inside the window with a constant value to enable the inner-cutout method to learn the local context of organs in the input patch.

According to another embodiment of methods 1600-1061, learning the reconstruction of the original image comprises training the pre-trained 3D model to learn the reconstruction by performing an image segmentation task to identify human organs or to identify tumors present on the human organs within a new medical image not included within any training data or training images upon which the pre-trained 3D model or the self-supervised learning framework was trained.

According to a particular embodiment, there is a non-transitory computer-readable storage medium having instructions stored thereupon that, when executed by a system having at least a processor and a memory therein, the instructions cause the processor to perform operations including: executing a pre-trained model from Models Genesis within a nnU-Net framework; learning generic anatomical patterns within the executing Models Genesis through self-supervised learning; transforming an original image using distortion and cutout-based methods; learning the reconstruction of the original image from the transformed image using an encoder-decoder architecture of the nnU-Net framework to identify the generic anatomical representation from the transformed image by recovering the original image; and wherein architecture determined by the nnU-Net framework is utilized with Models Genesis and is trained to minimize the L2 distance between the prediction and ground truth.

Figure 17:
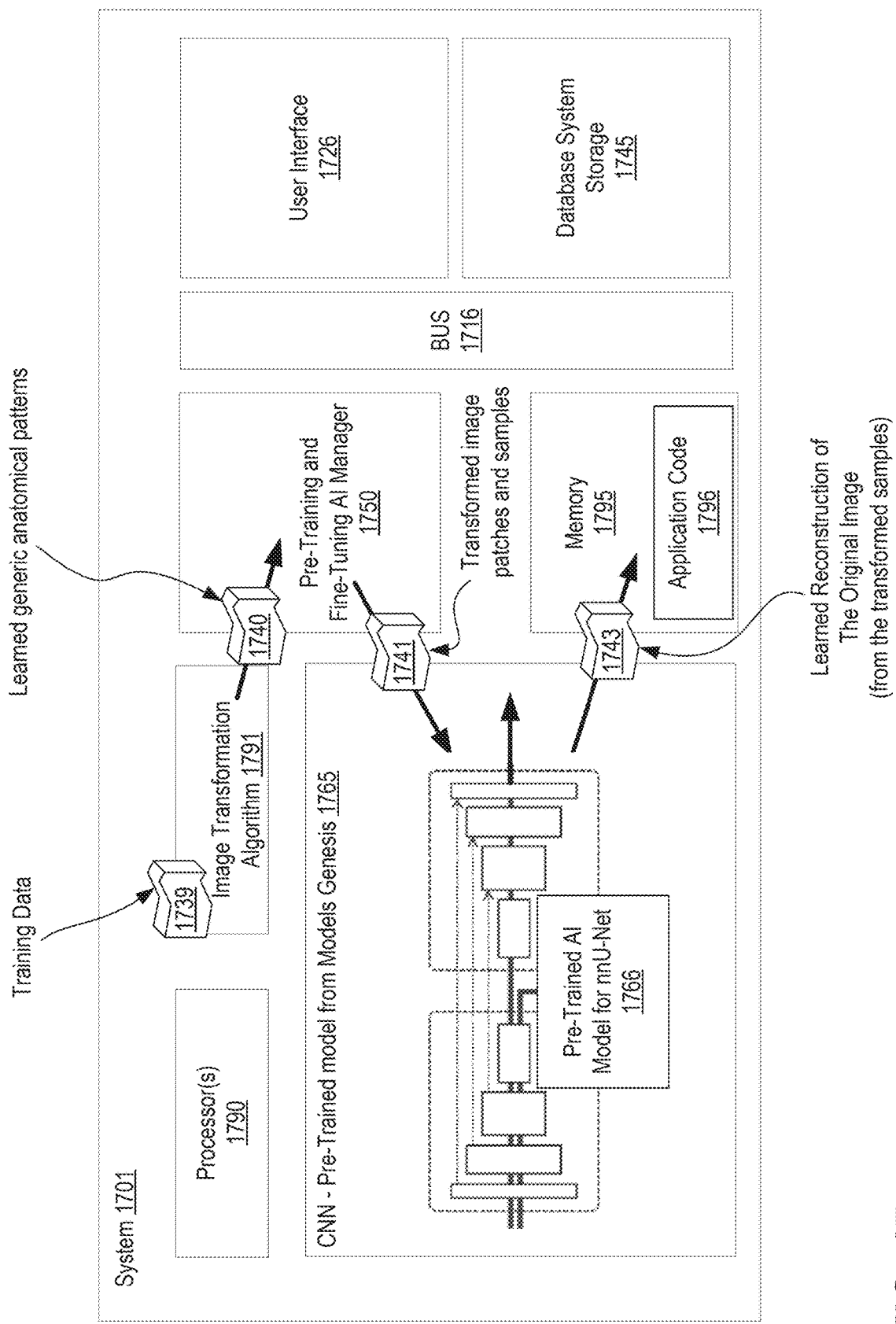
FIG. 17 shows a diagrammatic representation of a system within which embodiments may operate, be installed, integrated, or configured.

FIG. 17 shows a diagrammatic representation of a system 1701 within which embodiments may operate, be installed, integrated, or configured. In accordance with one embodiment, there is a system 1701 having at least a processor 1790 and a memory 1795 therein to execute implementing application code 1796. Such a system 1701 may communicatively interface with and cooperatively execute with the benefit of remote systems, such as a user device sending instructions and data, a user device to receive as an output from the system 1701 a specially pre-trained AI model for nnU-net 1766 having therein learned reconstruction of the original image (e.g., from the transformed samples) 1743 for use by a user via a nnU-Net execution framework for the purposes of diagnosing medical images.

According to the depicted embodiment, the system 1701, includes a processor 1790 and the memory 1795 to execute instructions at the system 1701. The system 1701 as depicted here is specifically customized and configured to systematically generate a pre-trained model for nnU-Net through the use of improved transfer learning techniques. The training data 1739 is processed through an image transformation algorithm 1791 from which learned generic anatomical patterns 1740 are extracted. A pre-training and fine-tuning AI manager 1750 may optionally be utilized to refine the prediction of a given object based upon additional training data provided to the system, such as the transformed image patches and samples captured from the original un-modified input images.

According to a particular embodiment, there is a specially configured system 1701 custom configured to generate a pre-trained model for nnU-Net through the use of improved transfer learning techniques. According to such an embodiment, the system 1701 includes: a memory 1795 to store instructions via executable application code 1796; a processor 1790 to execute the instructions stored in the memory 1795; in which the system 1701 is specially configured to execute the instructions stored in the memory via the processor which causes the system to execute a pre-trained model from Models Genesis within a nnU-Net framework; execute instructions via the processor for learning generic anatomical patterns within the executing Models Genesis through self-supervised learning; execute instructions via the processor for transforming an original image using distortion and cutout-based methods; execute instructions via the processor for learning the reconstruction of the original image from the transformed image using an encoder-decoder architecture of the nnU-Net framework to identify the generic anatomical representation from the transformed image by recovering the original image; utilize the architecture determined by the nnU-Net framework with Models Genesis to train the architecture to minimize the L2 distance between the prediction and ground truth; and further to output the trained architecture as a pre-trained model for nnU-Net.

According to another embodiment of the system 1701, a user interface 1716 communicably interfaces with a user client device remote from the system and communicatively interfaces with the system via a public Internet.

Bus 1716 interfaces the various components of the system 1701 amongst each other, with any other peripheral(s) of the system 1701, and with external components such as external network elements, other machines, client devices, cloud computing services, etc. Communications may further include communicating with external devices via a network interface over a LAN, WAN, or the public Internet.

FIG. 18 illustrates a diagrammatic representation of a machine 1801 in the exemplary form of a computer system, in accordance with one embodiment, within which a set of instructions, for causing the machine/computer system to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1801 includes a processor 1802, a main memory 1804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1818 (e.g., a persistent storage device including hard disk drives and a persistent database and/or a multi-tenant database implementation), which communicate with each other via a bus 1830. Main memory 1804 includes instructions for executing a pre-trained model from models genesis 1824 which provides a learned reconstruction of an original image 1823 as well as generates and makes available for execution a pre-trained AI model for nnU-Net 1825, in support of the methodologies and techniques described herein. Main memory 1804 and its sub-elements are further operable in conjunction with processing logic 1816 and processor 1802 to perform the methodologies discussed herein.

Processor 1802 represents one or more specialized and specifically configured processing devices such as a microprocessor, central processing unit, or the like. More particularly, the processor 1802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1802 may also be one or more special-purpose processing devices such as an application-specific integrated circuit (ASIC), a field programmable gate array (FPGA), a digital signal processor (DSP), network processor, or the like. Processor 1802 is configured to execute the processing logic 1816 for performing the operations and functionality which is discussed herein.

The computer system 1801 may further include a network interface card 1808. The computer system 1801 also may include a user interface 1810 (such as a video display unit, a liquid crystal display, etc.), an alphanumeric input device 1812 (e.g., a keyboard), a cursor control device 1813 (e.g., a mouse), and a signal generation device 1816 (e.g., an integrated speaker). The computer system 1801 may further include peripheral device 1836 (e.g., wireless or wired communication devices, memory devices, storage devices, audio processing devices, video processing devices, etc.).

The secondary memory 1818 may include a non-transitory machine-readable storage medium or a non-transitory computer readable storage medium or a non-transitory machine-accessible storage medium 1831 on which is stored one or more sets of instructions (e.g., software 1822) embodying any one or more of the methodologies or functions described herein. The software 1822 may also reside, completely or at least partially, within the main memory 1804 and/or within the processor 1802 during execution thereof by the computer system 1801, the main memory 1804 and the processor 1802 also constituting machine-readable storage media. The software 1822 may further be transmitted or received over a network 1820 via the network interface card 1808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
a memory to store instructions;
a set of one or more processors;
a non-transitory machine-readable storage medium that provides instructions that, when executed by the set of one or more processors, the instructions stored in the memory are configurable to cause the system to perform operations comprising:
receiving training data having a plurality of unlabeled images therein;
deriving a pre-trained model from generic autodidactic models which provide a starting point for parameter initialization in a target task within the nnU-Net framework via a self-supervised learning framework which trains 3D models using the unlabeled images by learning appearance, texture and context from the unlabeled images;
executing the pre-trained model within a nnU-Net framework;
learning generic anatomical patterns within the executing generic autodidactic models through self-supervised learning;
transforming an original image into a transformed image using distortion and cutout transformations;
generating a pre-trained model by training the 3D model to learn a reconstruction of the original image from the transformed image using an encoder-decoder architecture of the nnU-Net framework to identify generic anatomical representations from the transformed image by recovering the original image;

executing the trained 3D model to output a prediction of anatomical patterns from a medical image which forms no part of the training data; and wherein the encoder-decoder architecture determined by the nnU-Net framework is utilized with the generic autodidactic models and is trained to minimize the L2 distance between the prediction and ground truth.

2. The system of claim 1:

wherein the nnU-Net framework comprises a supervised adaptive framework which applies random parameter initialization within a generic U-Net's encoder-decoder architecture to perform image segmentation for an input image; and wherein deriving the pre-trained model from generic autodidactic models comprises deriving the pre-trained model from Models Genesis to provide the starting point for parameter initialization in the target task within the nnU-Net framework.

3. The system of claim 1, wherein the self-supervised learning comprises Non-Linear Transformation in which a Bezier curve is applied as transformation function on an input patch of the original image to enable the model to learn organ appearances and intensity mapping.

4. The system of claim 1, wherein the self-supervised learning comprises applying local pixel shuffling to sample a random window from an input patch of the original image which are captured as sampled images and then further wherein the local pixel shuffling shuffles the pixels contained in the captured sample images to enable the model to learn textures and edges of organs.

5. The system of claim 1, wherein the self-supervised learning comprises applying cutout methods including implementing an outer-cutout method and an inner-cutout method to enable the model to learn the context present in an input patch of the original image.

6. The system of claim 5:

wherein the outer-cutout method includes random windows of different sizes being superimposed together followed by randomly assigning the pixel values outside the window to enable the outer-cutout method to learn the global geometry and spatial layout of the organs in each input patch; and wherein the inner-cutout method includes assigning pixel values inside the window with a constant value to enable the inner-cutout method to learn the local context of organs in the input patch.

7. The system of claim 1, wherein learning the reconstruction of the original image comprises training the pre-trained 3D model to learn the reconstruction by performing an image segmentation task to identify human organs or to identify tumors present on the human organs within a new medical image not included within any training data or training images upon which the pre-trained 3D model or the self-supervised learning framework was trained.

8. A computer-implemented method executed by a system having at least a processor and a memory therein, wherein the method comprises:

receiving training data having a plurality of unlabeled images therein;

deriving a pre-trained model from generic autodidactic models which provide a starting point for parameter initialization in a target task within the nnU-Net framework via a self-supervised learning framework which trains 3D models using the unlabeled images by learning appearance, texture and context from the unlabeled images;

executing the pre-trained model within a nnU-Net framework;

learning generic anatomical patterns within the executing generic autodidactic models through self-supervised learning;

transforming an original image into a transformed image using distortion and cutout transformations;

generating a pre-trained model by training the 3D model to learn a reconstruction of the original image from the transformed image using an encoder-decoder architecture of the nnU-Net framework to identify generic anatomical representations from the transformed image by recovering the original image;

executing the trained 3D model to output a prediction of anatomical patterns from a medical image which forms no part of the training data; and wherein the encoder-decoder architecture determined by the nnU-Net framework is utilized with the generic autodidactic models and is trained to minimize the L2 distance between the prediction and ground truth.

9. The method of claim 8:

wherein the nnU-Net framework comprises a supervised adaptive framework which applies random parameter initialization within a generic U-Net's encoder-decoder architecture to perform image segmentation for an input image; and wherein deriving the pre-trained model from generic autodidactic models comprises deriving the pre-trained model from Models Genesis to provide the starting point for parameter initialization in the target task within the nnU-Net framework.

10. The method of claim 8, wherein the self-supervised learning comprises Non-Linear Transformation in which a Bezier curve is applied as transformation function on an input patch of the original image to enable the model to learn organ appearances and intensity mapping.

11. The method of claim 8, wherein the self-supervised learning comprises applying local pixel shuffling to sample a random window from an input patch of the original image which are captured as sampled images and then further wherein the local pixel shuffling shuffles the pixels contained in the captured sample images to enable the model to learn textures and edges of organs.

12. The method of claim 8, wherein the self-supervised learning comprises applying cutout methods including implementing an outer-cutout method and an inner-cutout method to enable the model to learn the context present in an input patch of the original image.

13. The method of claim 12:

wherein the outer-cutout method includes random windows of different sizes being superimposed together followed by randomly assigning the pixel values outside the window to enable the outer-cutout method to learn the global geometry and spatial layout of the organs in each input patch; and wherein the inner-cutout method includes assigning pixel values inside the window with a constant value to enable the inner-cutout method to learn the local context of organs in the input patch.

14. The method of claim 8, wherein learning the reconstruction of the original image comprises training the pre-trained 3D model to learn the reconstruction by performing an image segmentation task to identify human organs or to identify tumors present on the human organs within a new medical image not included within any training data or training images upon which the pre-trained 3D model or the self-supervised learning framework was trained.

15. Non-transitory computer readable storage media having instructions stored thereupon that, when executed by a system having at least a processor and a memory therein, the instructions cause the processor to perform operations including:
- receiving training data having a plurality of unlabeled images therein;
- deriving a pre-trained model from generic autodidactic models which provide a starting point for parameter initialization in a target task within the nnU-Net framework via a self-supervised learning framework which trains 3D models using the unlabeled images by learning appearance, texture and context from the unlabeled images;
- executing the pre-trained model within a nnU-Net framework;
- learning generic anatomical patterns within the executing generic autodidactic models through self-supervised learning;
- transforming an original image into a transformed image using distortion and cutout transformations;
- generating a pre-trained model by training the 3D model to learn a reconstruction of the original image from the transformed image using an encoder-decoder architecture of the nnU-Net framework to identify generic anatomical representations from the transformed image by recovering the original image;
- executing the trained 3D model to output a prediction of anatomical patterns from a medical image which forms no part of the training data; and
- wherein the encoder-decoder architecture determined by the nnU-Net framework is utilized with the generic autodidactic models and is trained to minimize the L2 distance between the prediction and ground truth.

16. The non-transitory computer readable storage media of claim 15, wherein the self-supervised learning comprises Non-Linear Transformation in which a Bezier curve is applied as transformation function on an input patch of the original image to enable the model to learn organ appearances and intensity mapping.

17. The non-transitory computer readable storage media of claim 15, wherein the self-supervised learning comprises applying local pixel shuffling to sample a random window from an input patch of the original image which are captured as sampled images and then further wherein the local pixel shuffling shuffles the pixels contained in the captured sample images to enable the model to learn textures and edges of organs.

18. The non-transitory computer readable storage media of claim 15, wherein the self-supervised learning comprises applying cutout methods including implementing an outer-cutout method and an inner-cutout method to enable the model to learn the context present in an input patch of the original image.

19. The non-transitory computer readable storage media of claim 17:
- wherein the outer-cutout method includes random windows of different sizes being superimposed together followed by randomly assigning the pixel values outside the window to enable the outer-cutout method to learn the global geometry and spatial layout of the organs in each input patch; and
- wherein the inner-cutout method includes assigning pixel values inside the window with a constant value to enable the inner-cutout method to learn the local context of organs in the input patch.

20. The non-transitory computer readable storage media of claim 15, wherein learning the reconstruction of the original image comprises training the pre-trained 3D model to learn the reconstruction by performing an image segmentation task to identify human organs or to identify tumors present on the human organs within a new medical image not included within any training data or training images upon which the pre-trained 3D model or the self-supervised learning framework was trained.

* * * * *